United States Patent

Hayakawa

(10) Patent No.: US 9,478,995 B2
(45) Date of Patent: Oct. 25, 2016

(54) BATTERY SYSTEM

(75) Inventor: Hirohiko Hayakawa, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 235 days.

(21) Appl. No.: 14/354,567

(22) PCT Filed: Oct. 28, 2011

(86) PCT No.: PCT/JP2011/074951
§ 371 (c)(1),
(2), (4) Date: Apr. 26, 2014

(87) PCT Pub. No.: WO2013/061461
PCT Pub. Date: May 2, 2013

(65) Prior Publication Data
US 2014/0266051 A1    Sep. 18, 2014

(51) Int. Cl.
*H02J 7/00* (2006.01)
*B60L 11/18* (2006.01)
(Continued)

(52) U.S. Cl.
CPC .......... *H02J 7/0019* (2013.01); *B60L 11/1848* (2013.01); *H02J 7/007* (2013.01); *H02J 7/0016* (2013.01); *H02J 7/0018* (2013.01);
(Continued)

(58) Field of Classification Search
CPC ...... H02J 7/0019; H02J 7/0018; H02J 7/007; H02J 7/0016; B60L 11/1848; H01M 10/482; H01M 2010/4278; H01M 2220/20; H01M 2010/4271; Y02T 10/7055
USPC ....................................................... 320/118
See application file for complete search history.

(56) References Cited

U.S. PATENT DOCUMENTS 5,710,504 A    1/1998 Pascual et al.
5,745,353 A *  4/1998 Sato ........................ H02M 1/34
                                                363/131

(Continued)

FOREIGN PATENT DOCUMENTS

CN    101821920 A    9/2010
EP    2 372 865 A2   10/2011

(Continued)

OTHER PUBLICATIONS

Extended European Search Report issued Sep. 7, 2015, in European Patent Application No. EP11874606.4.

(Continued)

*Primary Examiner* — Jack Chiang
*Assistant Examiner* — Brandon Bowers
(74) *Attorney, Agent, or Firm* — Shapiro, Gabor and Rosenberger, PLLC

(57) ABSTRACT

An ECU outputs, when it determines that there is a battery cell which needs charging, address information to a battery monitor AFE 6. The battery monitor AFE 6 turns ON a transistor specified by the address information and outputs an active ON/OFF signal to a balancing circuit 4. To the balancing circuit 4, a DC converter 30 to which each of battery cells 2a are connected is provided, and selectively charges the battery cells by operating the DC converter 30. When the ON/OFF signal is active, the DC converter 30 is formed of a magnetic-amplifier type forward converter and selectively charges the battery cells having a low cell voltage when the voltage of the battery cells is about lower than 4.2 V, and eventually maintains the cell voltage at about 4.2 V to prevent overcharging to the battery cells 2a.

10 Claims, 18 Drawing Sheets

(51) Int. Cl.
*H01M 10/42* (2006.01)
*H01M 10/48* (2006.01)

(52) U.S. Cl.
CPC ... *H01M10/482* (2013.01); *H01M 2010/4271* (2013.01); *H01M 2010/4278* (2013.01); *H01M 2220/20* (2013.01); *Y02T 10/7055* (2013.01)

(56) References Cited

U.S. PATENT DOCUMENTS

| | | |
|---|---|---|
| 7,615,966 B2 | 11/2009 | Houldsworth et al. |
| 2009/0322155 A1 | 12/2009 | Oh et al. |
| 2010/0007308 A1* | 1/2010 | Lee ............... H02J 7/0018 320/118 |
| 2010/0207579 A1 | 8/2010 | Lee et al. |
| 2011/0074354 A1 | 3/2011 | Yano |

FOREIGN PATENT DOCUMENTS

| | | |
|---|---|---|
| JP | 2009-540793 A | 11/2009 |
| JP | 2011-501639 A | 1/2011 |
| WO | WO 2008/097033 A1 | 8/2008 |

OTHER PUBLICATIONS

Kim, C-H., et al., "Individual Charge Equalization Converter with Parallel Primary Winding of Transformer for Series Connected Lithium-Ion Battery Strings in an HEV", Journal of Power Electronics, May 2009, pp. 472-480, vol. 9-No. 3.

Office Action issued Dec. 9, 2014, in Japanese Patent Application No. 2013-540592.

Office Action, issued Nov. 30, 2015, in Chinese Application No. 201180074346.0.

* cited by examiner

CHARGING

ASSUME THAT DISCHARGE CAPACITY IS CE3 < CE4 < CE1 < CE2

VH (MAXIMUM OPERATING VOLTAGE)

VL (MINIMUM OPERATING VOLTAGE)

VH
UNABLE TO CHARGE

VL

BATTERY SYSTEM

TECHNICAL FIELD

The present invention relates to charging technology of a secondary battery and more particularly relates to technology that is effective in controlling cell balance of secondary battery cells composing a secondary battery.

BACKGROUND ART

Batteries used in EV (Electric Vehicle), HEV (Hybrid Electric Vehicle) and so forth are made for high voltage. In a power supply system having this type of battery, semiconductor integrated circuit devices such as a battery monitor AFE (Analog Front End) for controlling charging/discharging and monitoring of the battery are provided.

This type of semiconductor integrated circuit device generally has a so-called conditioning circuit having a selective charging/discharging function of a battery cell, the conditioning circuit preventing, by uniforming voltages of the battery cells, significant degradation of available electric energy as considered as a battery (as a whole) as compared with a total of discharge capacities which the battery cells have.

As cell balancing technology (uniforming each battery cell voltage) for this type of battery, there are technology of uniforming charges of cells next to each other by a back boost converter etc. (e.g., see Patent Literature 1), technology of injecting charges to a specific battery cell from the whole battery using a converter (e.g., see Non-Patent Literature 1), technology of using a switching element and a capacitor to which technology of charge pump is applied (e.g., see Patent Literature 2), and so forth.

Patent Literature 1 is about a method of uniforming charges between two cells next to each other by voltages of both of the cells. According to this switching operation for alternately opening and closing a switch connected to upper and lower cells with the same pulse width interposing a restricted band, energy of one of the cells is stored in an inductor connected at a middle point of the two cells and then the energy is transferred to the other cell.

When the voltages of the two cells are different by a certain amount that is determined by a circuit constant and a pulse width or more, the energy flows from a cell at a higher voltage to a cell at a lower voltage; when the difference is the certain amount or less, flows of the energy from a cell at a higher voltage to a cell at a lower voltage and from a voltage at a lower cell to a cell at a higher cell are generated at the same time and a rate of the flows depends on the voltages of the cells.

By virtue of this phenomenon, as the voltages of the two cells gradually come close and then the voltage of each cell becomes completely the same. In this case, the two flows of energy coincide. When the number of the cells is three or more, two switches are needed for one inductor with respect to neighboring two cells. When a battery is formed of N cells, N−1 inductors and 2N−2 switches are needed.

In addition, the active cell balance system using a converter described in Non-Patent Literature 1 is a system for extracting energy from between an electrode on the higher-potential side, that is, a positive electrode of the battery cells serially connected and an electrode on the lower-potential side. It is a system for charging energy extracted from the whole battery to battery cells.

Moreover, the technology described in Patent Literature 2 composes a main part by a switch and a capacitor in the same manner as the charge pump. Charges once stored in the capacitor are transferred to another cell etc. in the method.

CITATION LIST

Patent Literature

Patent Literature 1: U.S. Pat. No. 7,615,966
Patent Literature 2: U.S. Pat. No. 5,710,504

Non Patent Literature

Non Patent Literature 1: Journal of Power Electronics, Vol. 9, No. 3, May 2009, p. 472

DISCLOSURE OF THE INVENTION

Problems to be Solved by the Invention

The inventor of the present invention has been found out, however, the following problems in the cell balancing technology of batteries as explained in the foregoing.

First, in the technology of Patent Literature 1, there is a problem of the transfer being limited in neighboring cells. Although it is practical when the number of cells in a battery is 2 to 4, many of vehicle-mounted battery cells are formed of about 96 cells and thus too much time is needed until all the cells are balanced. In addition, there is a problem that control of the whole system is difficult since the convergence time depends on positions of cells at high voltage and cells at low voltage and also voltages of cells between cells at high voltage and cells at low voltage.

Moreover, since it is needed to operate all the switches connected to upper and lower cells, even when voltages of neighboring cells is the same, the energy flow (charging/discharging) is always continuing and thus loss due to circuit operation is large.

Next, in the case of Non-Patent Literature 1, since there is no control circuit for each cell, it is difficult to strictly keep operating voltage of the cells and thus occurrence of problems is feared in view of function safety.

In addition, in the technology of the charge pump of Patent Literature 2, there is a problem of complexity posed in the control of switches used in the charge pump.

Further, in Patent Literature 2, since the impedance of the switch is directly reflected on efficiency, it is needed to lower the impedance. As the number of times of switching is predicted to be very large regarding the switching element, semiconductor elements such as MOSFET (Metal Oxide-Semiconductor Field Effect Transistor) etc. are suitable; however, since the peak current is large in them, the switching element may be expensive.

A preferred aim of the present invention is to provide technology capable of efficiently charging optional secondary battery cells with easy control and a low cost.

The above and other preferred aims and novel characteristics of the present invention will be apparent from the description of the present specification and the accompanying drawings.

Means for Solving the Problems

The typical ones of the inventions disclosed in the present application will be briefly described as follows.

To achieve the aim mentioned above, a battery system for charging optional secondary battery cells and controlling balancing is achieved. The battery system includes a battery formed of a plurality of secondary battery cells being directly connected, and a battery control unit for controlling charging and discharging of the battery.

Further, the battery control unit includes a battery monitor unit for monitoring the secondary battery cells and a cell-balancing circuit for controlling cell balancing of the battery, the cell-balancing circuit including: a pulse generating circuit to which a second power supply voltage made by stepping down a first power supply voltage supplied from the battery is supplied, the pulse generating circuit generating pulse signals having an optional cycle from the second power supply voltage; and first DC converters connected to the secondary battery cells, respectively, and generating a charging voltage for charging the secondary battery cells based on the pulse signals generated by the pulse generating circuit.

Moreover, the battery monitor unit specifies, based on a charge control signal for selecting which of the secondary battery cells to charge, outputs operation control signal to the first DC converter to which the secondary battery cells are connected, and the first DC converter is operated based on the operation control signal and charges the secondary battery cells.

Effects of the Invention

The effects obtained by typical aspects of the present invention will be briefly described below.
(1) Reliability of battery systems can be improved.
(2) Costs of battery systems can be lowered.
(3) Battery life of batteries can be enhanced.

BRIEF DESCRIPTIONS OF THE DRAWINGS

BEST MODE FOR CARRYING OUT THE INVENTION

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
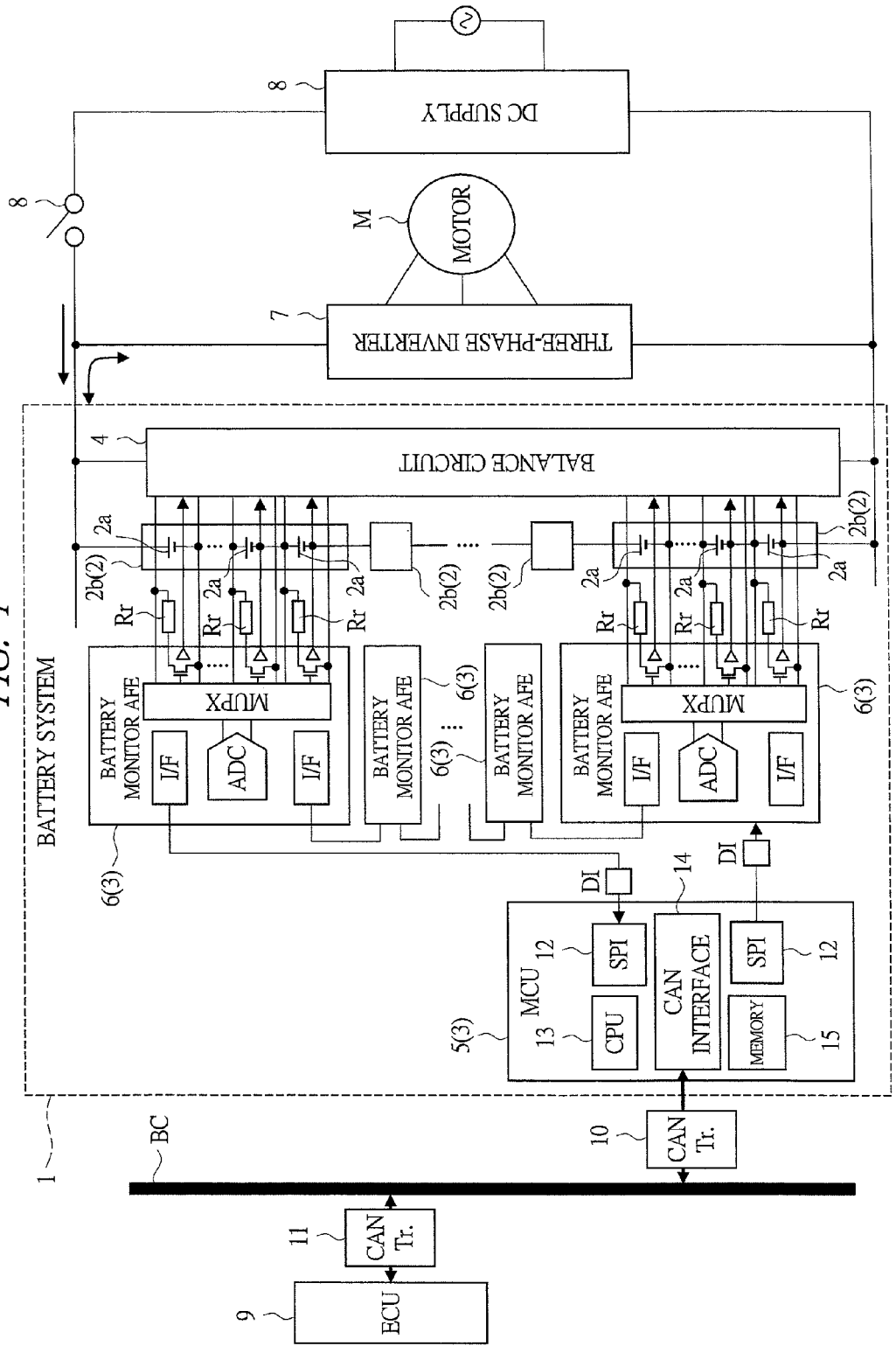
FIG. 1 is an explanatory diagram illustrating an example of a configuration of a battery system according to a first embodiment of the present invention.
Figure 2:
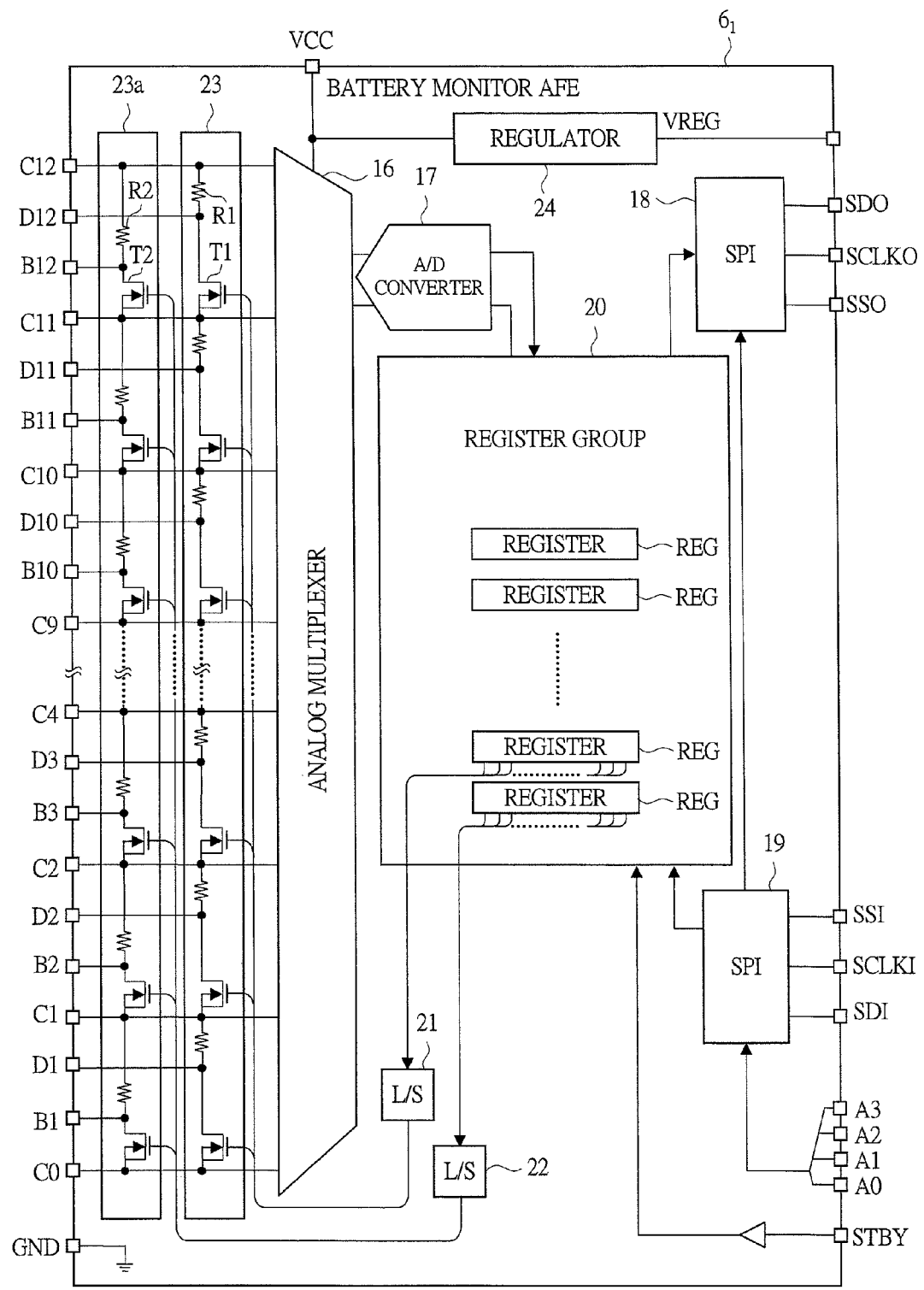
FIG. 2 is an explanatory diagram illustrating an example of a configuration of a battery monitor AFE provided in the battery system of FIG. 1.
Figure 4A:
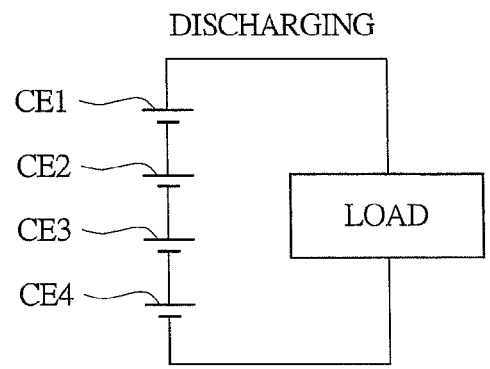
FIGS. 4A to 4C are explanatory diagrams of a mechanism of reducing power of the battery cell upon discharging (usage)
Figure 4B:
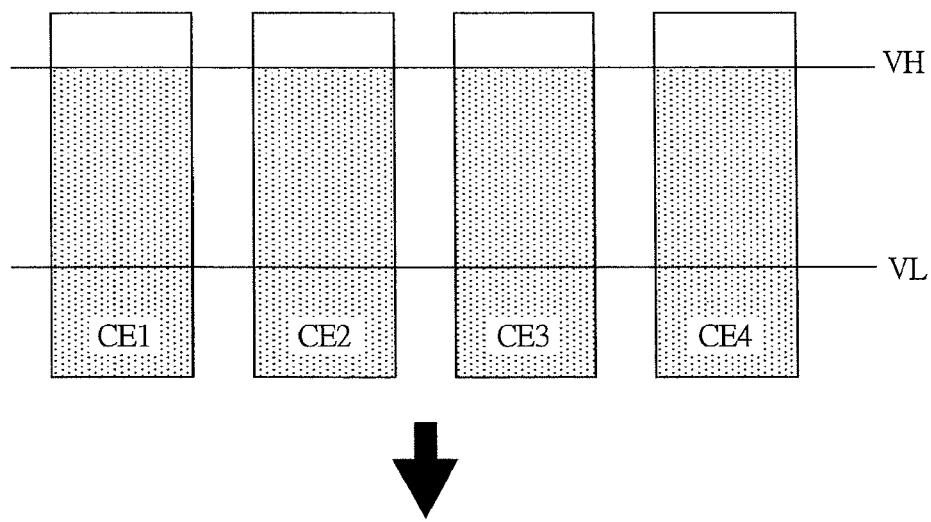
Figure 4C:
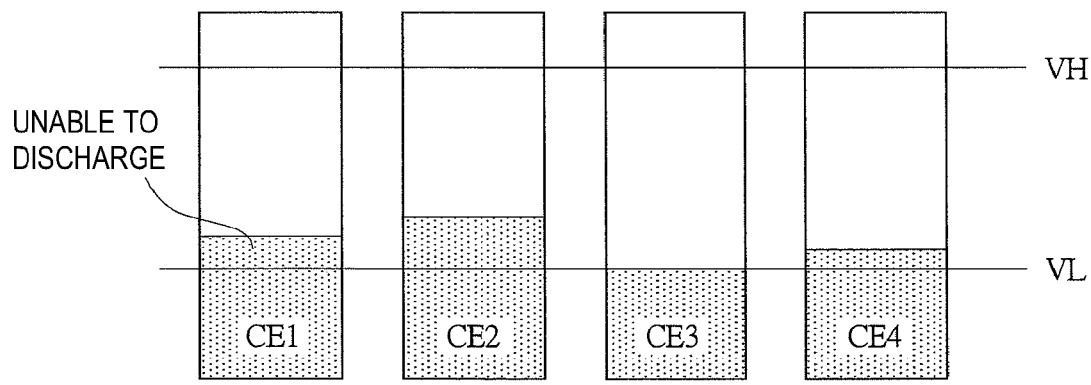
Figure 5:
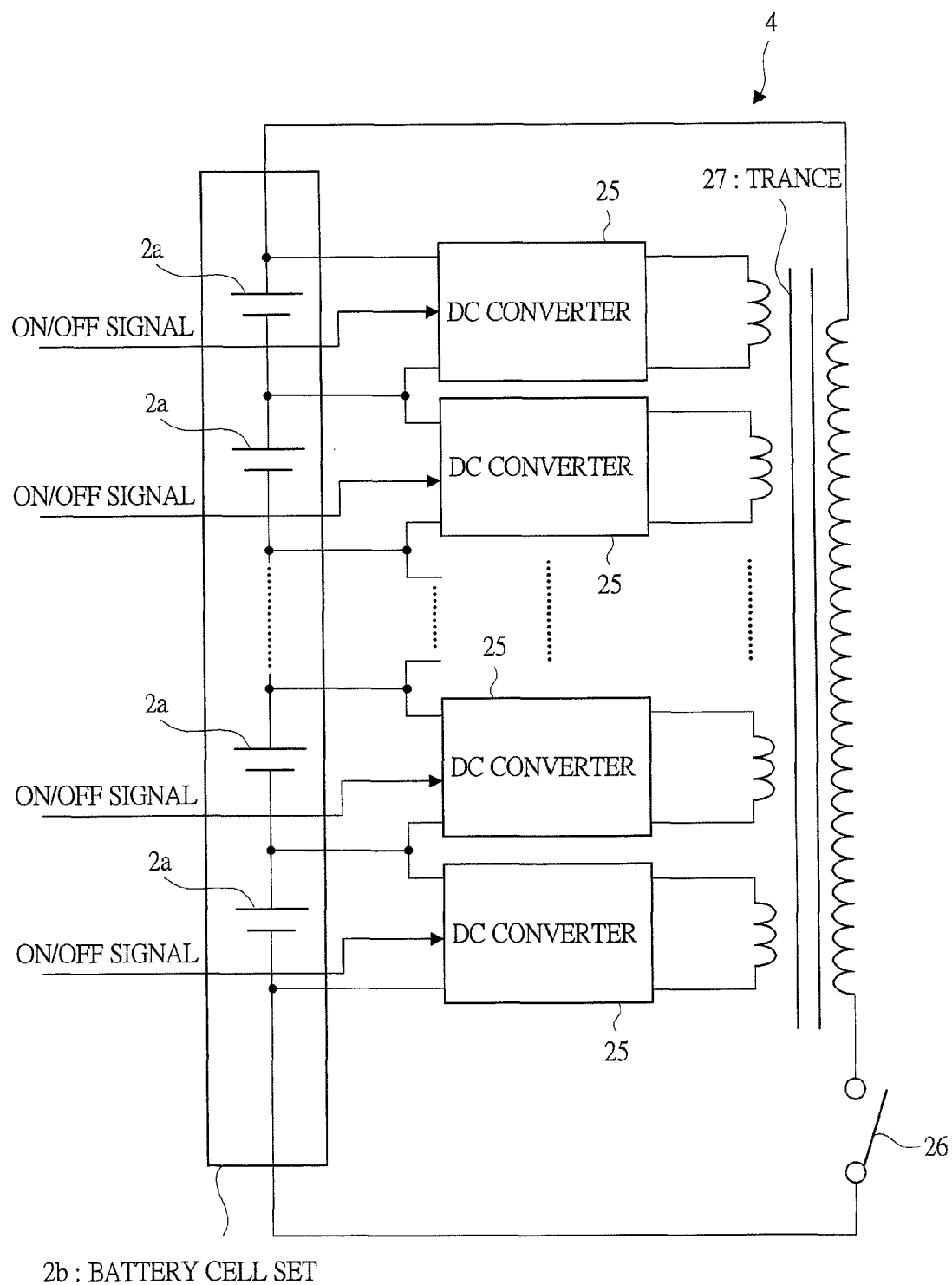
FIG. 5 is an explanatory diagram illustrating a principle of a balancing circuit provided to a battery system of FIG. 1.
Figure 6:
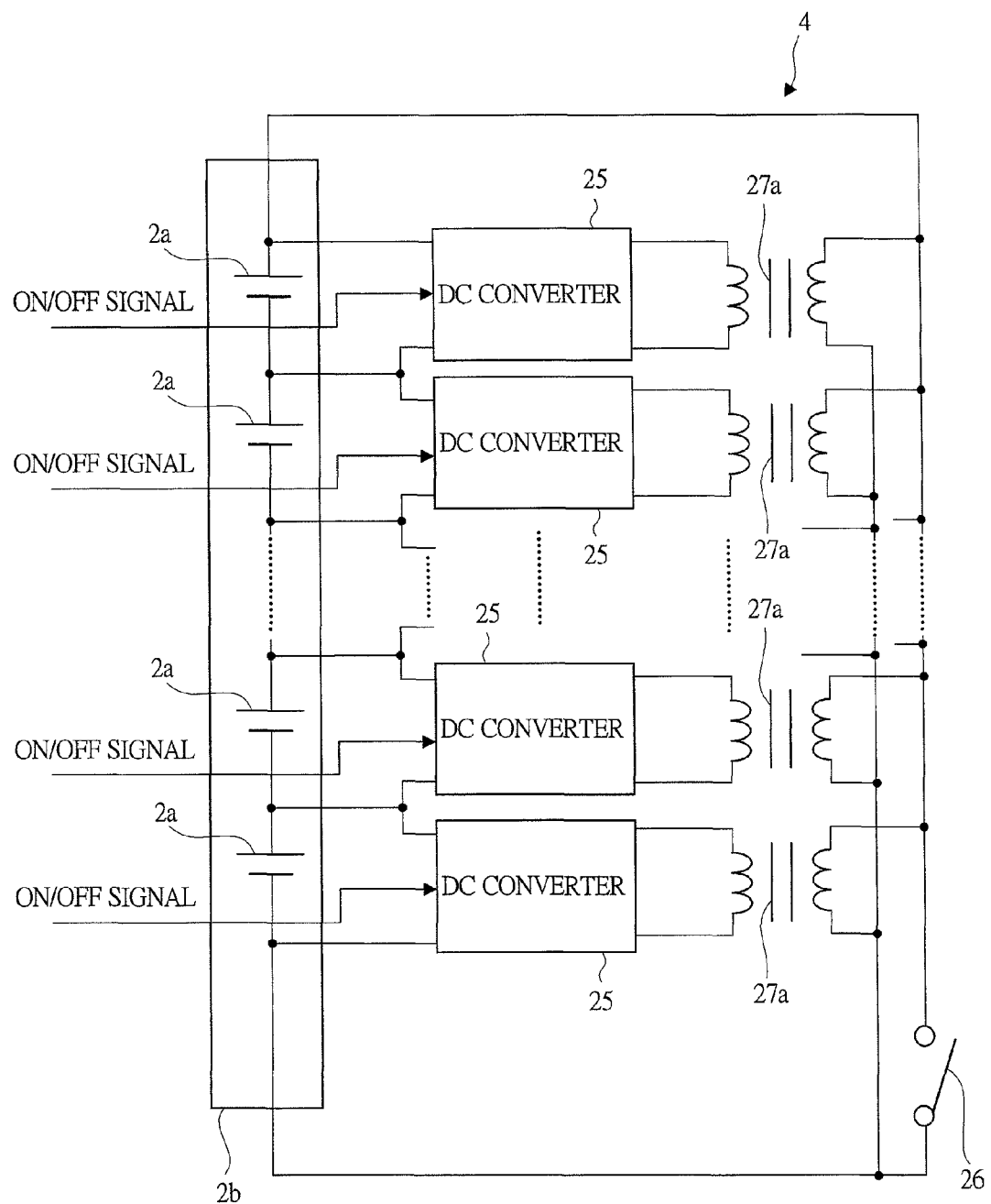
FIG. 6 is an explanatory diagram illustrating a modification example of a balancing circuit illustrated in FIG. 5.
Figure 7:
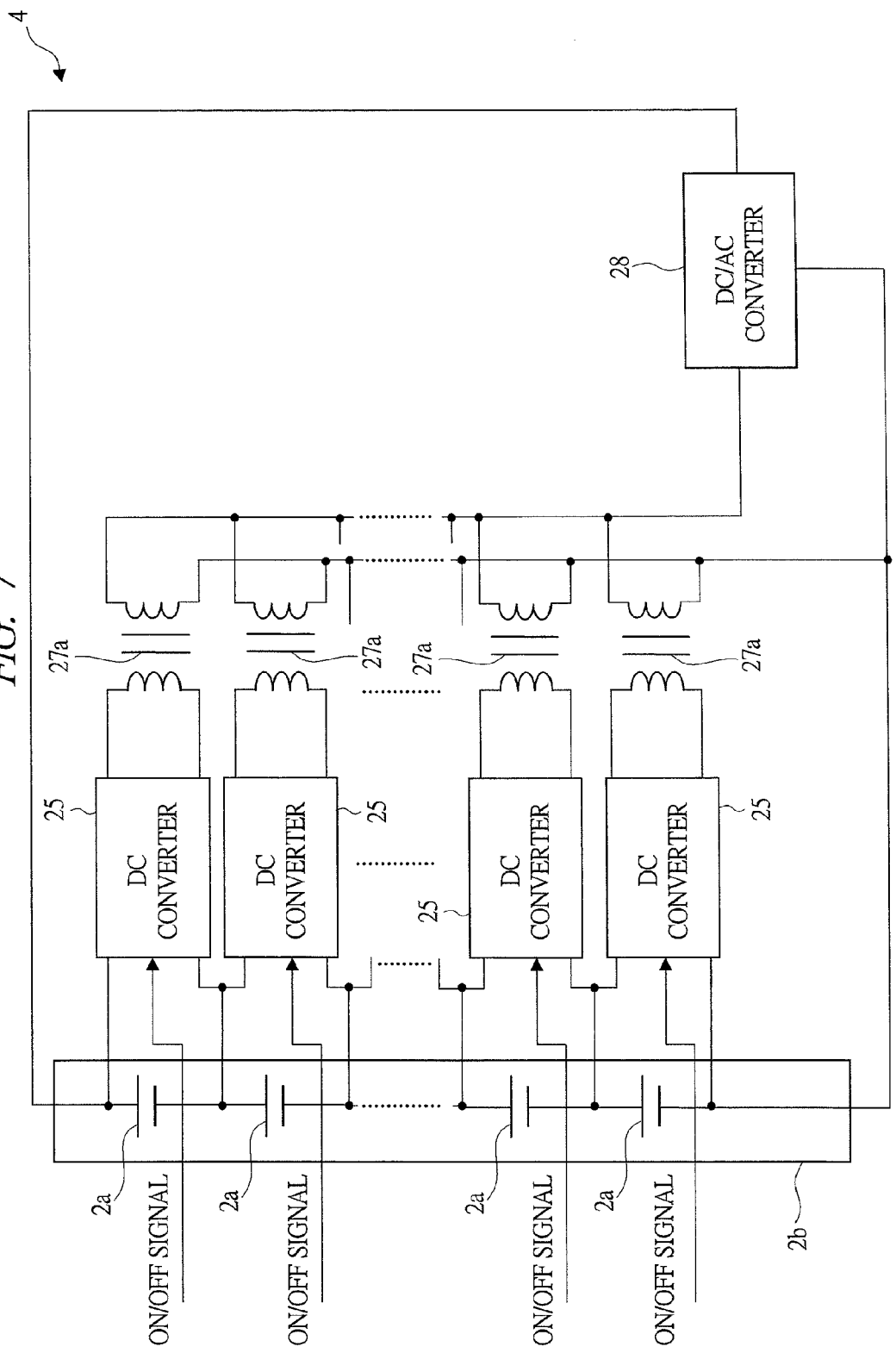
FIG. 7 is an explanatory diagram illustrating another modification example of the balancing circuit illustrated in FIG. 6.
Figure 8:
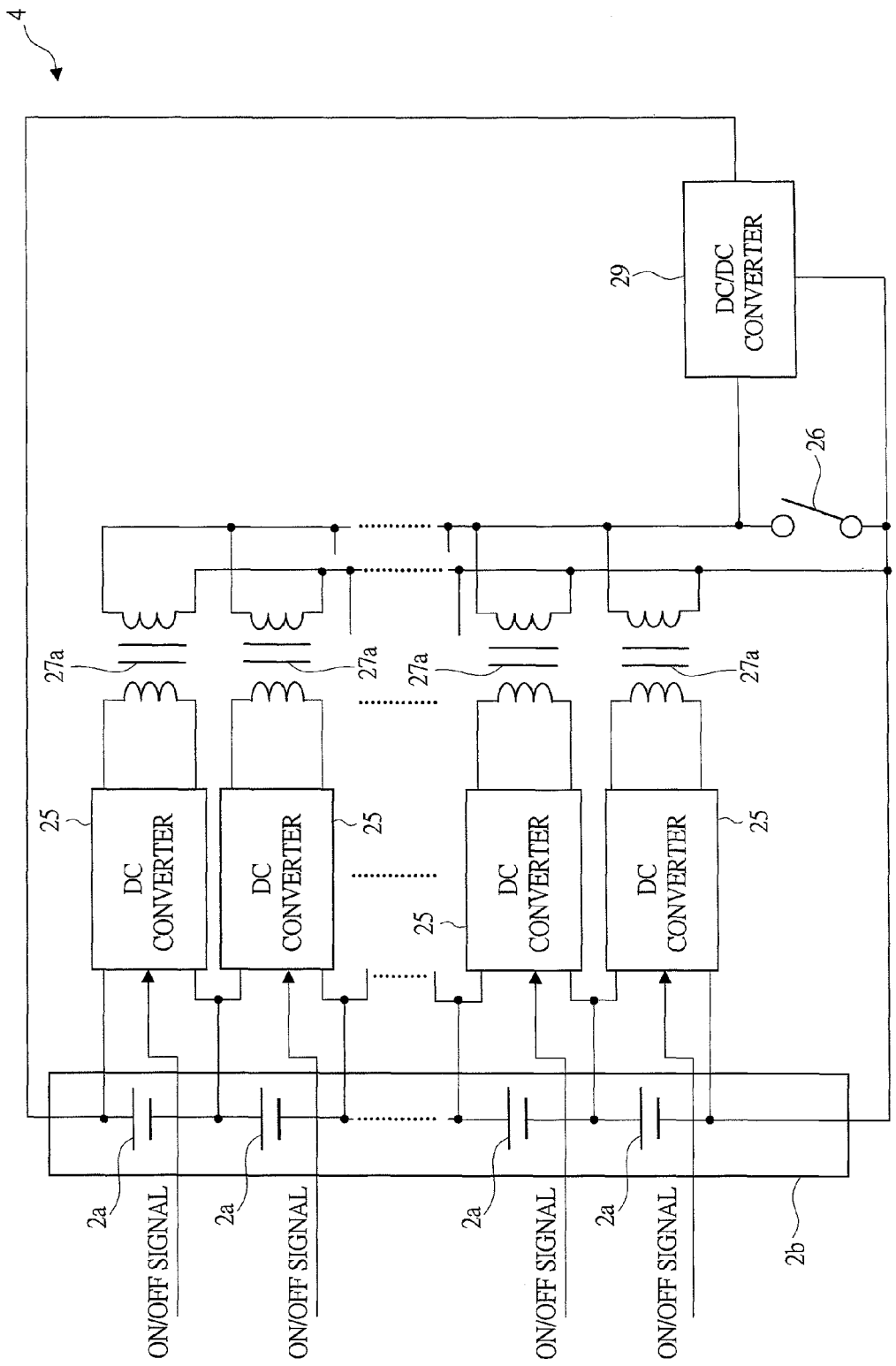
FIG. 8 is an explanatory diagram illustrating another modification example of the balancing circuit of FIG. 6.
Figure 9:
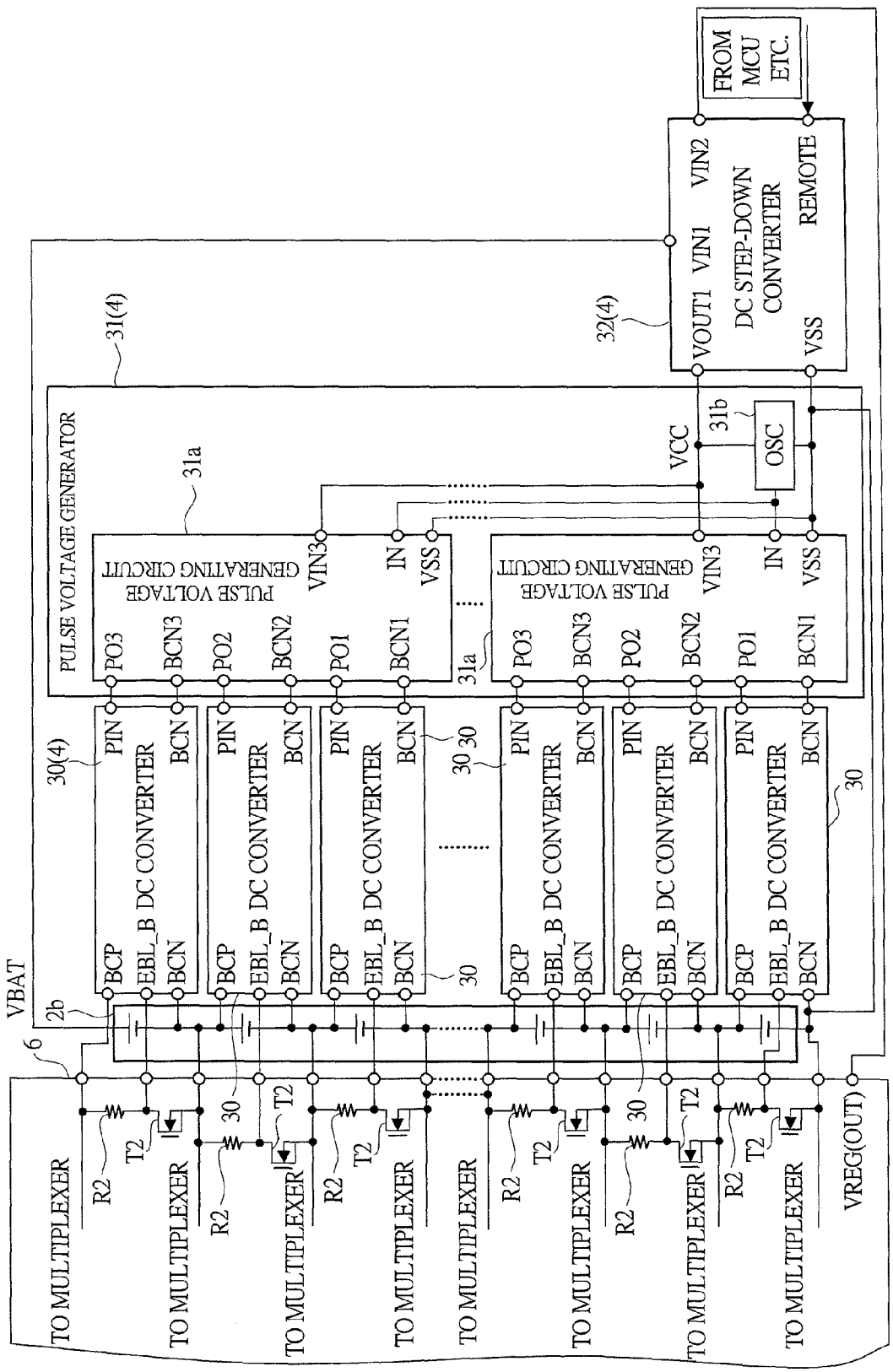
FIG. 9 is an explanatory diagram illustrating an example of a specific circuit configuration of the balancing circuit provided to the battery system of FIG. 1.
Figure 10:
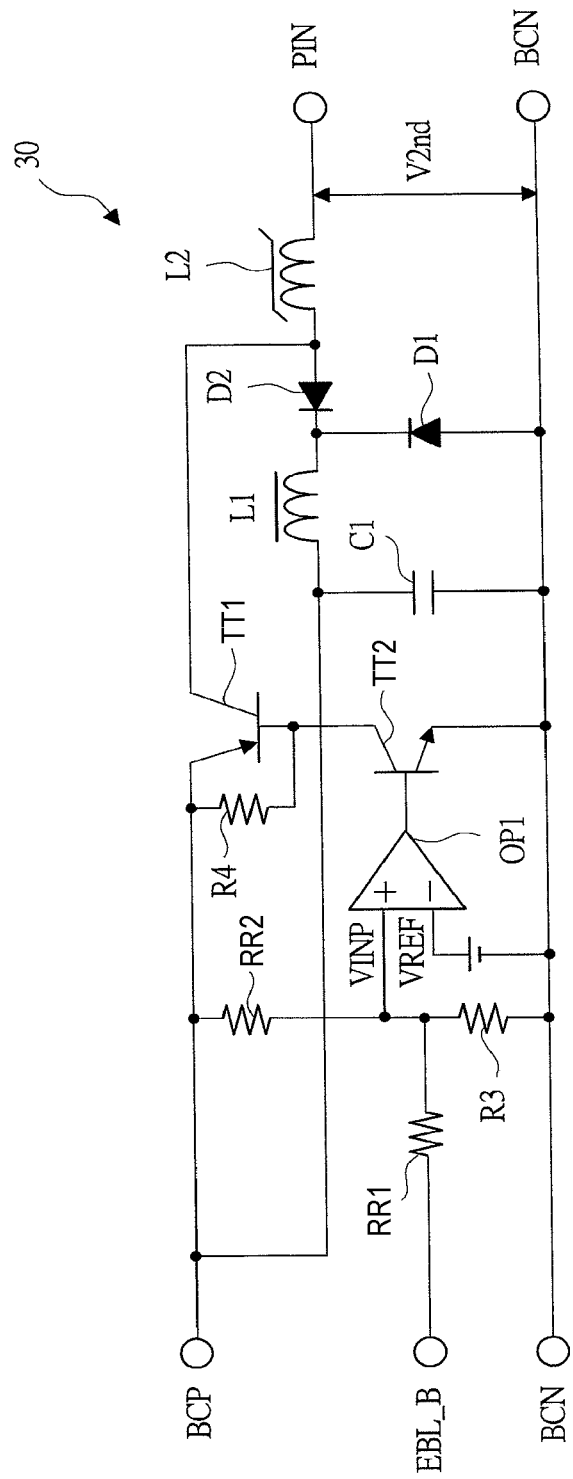
FIG. 10 is an explanatory diagram illustrating an example of a DC converter provided to the balancing circuit of FIG. 9.
Figure 11:
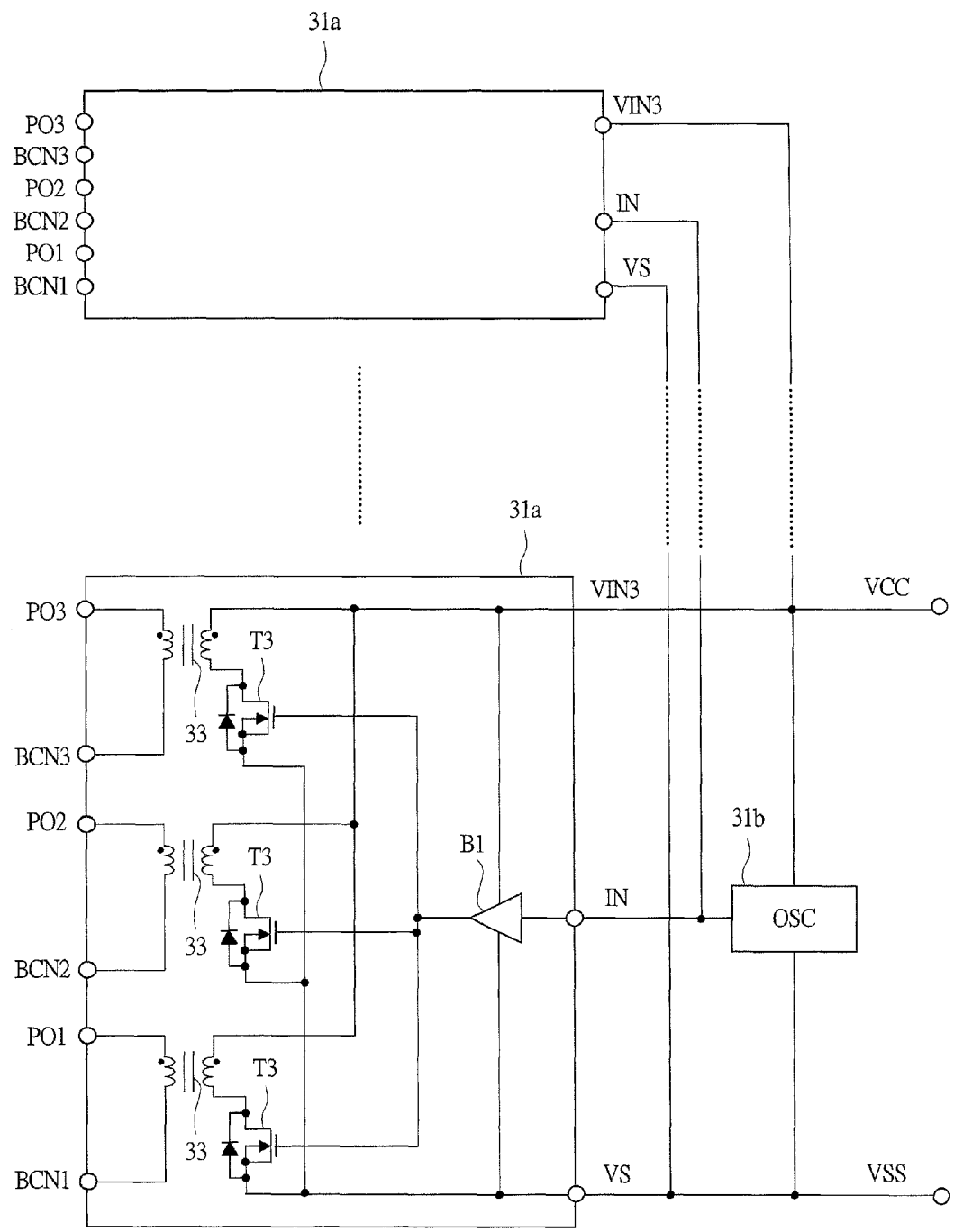
FIG. 11 is an explanatory diagram illustrating an example of a pulse voltage generating circuit provided to the balancing circuit of FIG. 9.
Figure 12:
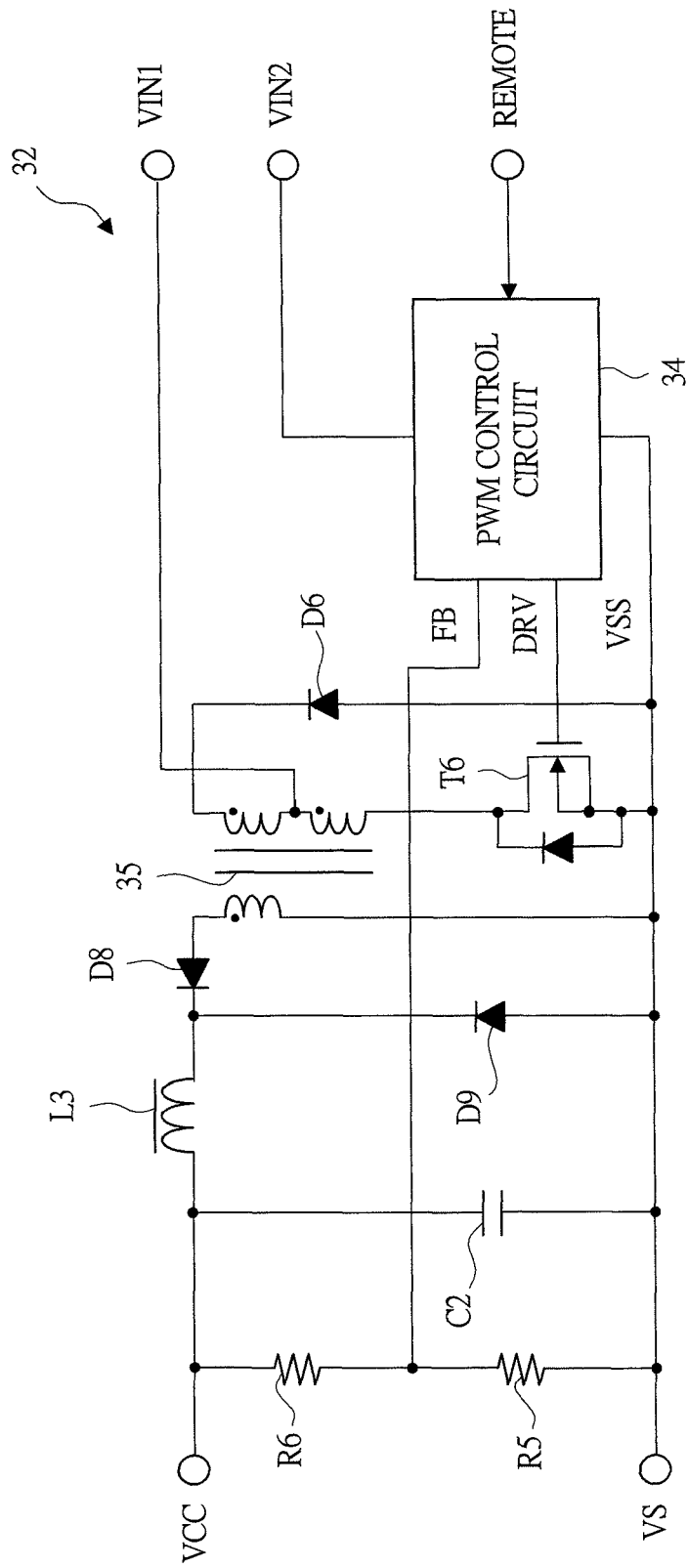
FIG. 12 is an explanatory diagram illustrating an example of a configuration of a DC step-down converter provided to the balancing circuit of FIG. 9.
Figure 13:
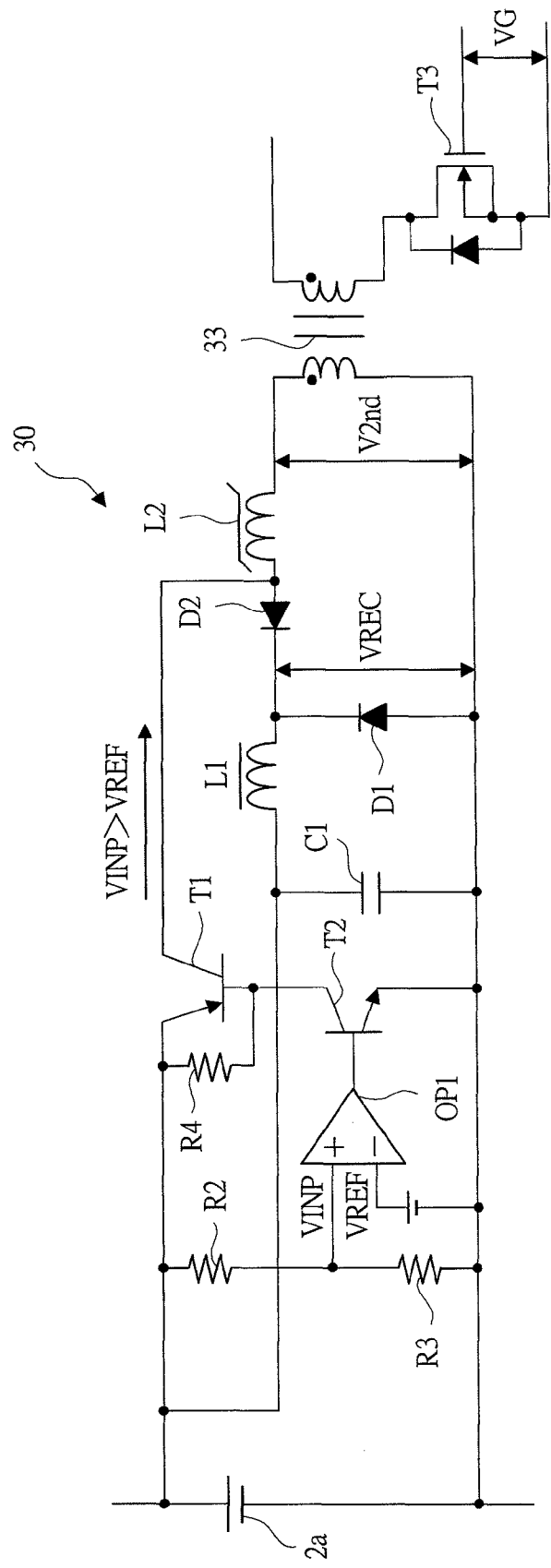
FIG. 13 is a schematic diagram illustrating parts of the DC converter of FIG. 9 and the pulse voltage generating circuit of FIG. 11.
Figure 14:
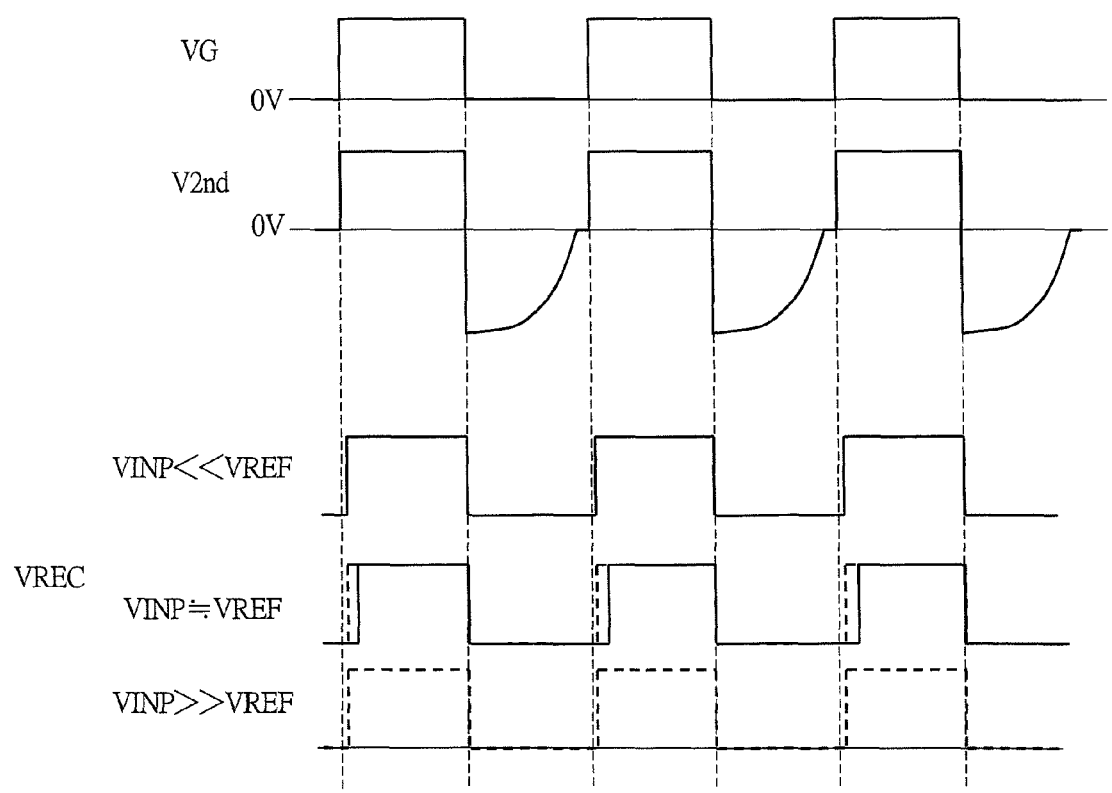
FIG. 14 is a timing chart of signals of respective parts in FIG. 13.

FIG. 1 is an explanatory diagram illustrating an example of a configuration of a battery system according to a first embodiment of the present invention; FIG. 2 is an explanatory diagram illustrating an example of a configuration of a battery monitor AFE provided in the battery system of FIG. 1; FIG. 3 is an explanatory diagram illustrating an mechanism of reducing power of a battery cell upon charging; FIG. 4 is an explanatory diagram of a mechanism of reducing power of the battery cell upon discharging (usage); FIG. 5 is an explanatory diagram illustrating a principle of a balancing circuit provided to a battery system of FIG. 1; FIG. 6 is an explanatory diagram illustrating a modification example of a balancing circuit illustrated in FIG. 5; FIG. 7 is an explanatory diagram illustrating another modification example of the balancing circuit illustrated in FIG. 6; FIG. 8 is an explanatory diagram illustrating another modification example of the balancing circuit of FIG. 6; FIG. 9 is an explanatory diagram illustrating an example of a specific circuit configuration of the balancing circuit provided to the battery system of FIG. 1; FIG. 10 is an explanatory diagram illustrating an example of a DC converter provided to the balancing circuit of FIG. 9; FIG. 11 is an explanatory diagram illustrating an example of a pulse voltage generating circuit provided to the balancing circuit of FIG. 9; FIG. 12 is an explanatory diagram illustrating an example of a configuration of a DC step-down converter provided to the balancing circuit of FIG. 9; FIG. 13 is a schematic diagram illustrating parts of the DC converter of FIG. 9 and the pulse voltage generating circuit of FIG. 11; and FIG. 14 is a timing chart of signals of respective parts in FIG. 13.

SUMMARY OF THE EMBODIMENT

A summary of the present embodiment is applied to a battery system (battery system 1) including a battery (battery 2) formed of a plurality of secondary battery cells (battery cells 2a) being connected in series and a battery control unit (balancing circuit 4, MCU 5, battery monitor AFE 6) for controlling charging and discharging of the battery.

In addition, the battery control unit includes a battery monitor unit (battery monitor AFE 6) for monitoring the secondary battery cells and a cell balancing circuit (balancing circuit 4) for controlling cell balancing of the battery.

Further, the cell balancing circuit includes: a pulse generating circuit (pulse voltage generating circuit 31a, pulse signal generating circuit 31b) supplied with a second power supply voltage (power supply voltage VCC) made by stepping down a first power supply voltage (power supply voltage VBAT) supplied from the battery, the pulse generating circuit generating a pulse signal having an optional cycle from the second power supply voltage; and first DC converters connected to the secondary battery cells and generating a charging voltage for charging the secondary battery cells based on the pulse signal generated by the pulse generating circuit.

Moreover, the battery monitor unit specifies the secondary battery cells to charge based on a charge control signal (address information) for selecting which of the secondary battery cells to charge, and outputs an operation control signal (ON/OFF signal) to the first DC converters to which the secondary battery cells are connected, the first DC converter being operated based on the operation control signal outputted from the battery monitor unit, so that the secondary battery cell is charged.

Hereinafter, the embodiment will be described in detail based on the summary described above.

<Configuration Example of the Battery System>

In the first embodiment, the battery system 1 is, for example, a power supply system mounted on a vehicle such as an EV or HEV. The battery system 1 is formed of a battery 2, a battery control unit 3, and a balancing circuit 4 as illustrated in FIG. 1.

The battery 2 is a rechargeable secondary battery and is formed of, for example, several tens to several hundreds of battery cells 2a having a standard voltage of 3.6 V and connected in series. The battery control unit 3 is a battery voltage controlling IC for performing various monitoring about overcharge, overdischarge and overcurrent of the battery 2 and battery protection, etc., the battery control unit 3 being formed of an MCU (Micro-Control Unit) 5 and a plurality of battery monitor AFEs 6. The MCU 5 and the battery monitor AFEs 6 are formed to, for example, individual semiconductor chip.

The MCU 5 transmits a monitoring result of the battery cells 2a via a CAN (Controller Area Network) described later and also receives a control signal of the battery system 1. The battery monitor AFEs 6 are battery-cell monitoring ICs for acquiring monitoring information of the battery cells based on instructions outputted from the MCU 5.

The battery monitor AFEs 6 for example monitor and control the battery cells 2a provided to one battery cell set 2b by one battery monitor AFE. The battery cell set 2b is formed of, for example, about 6 to 14 battery cells connected in series. Monitoring information of the battery cells 2a acquired by each of the battery monitor AFEs 6 are transmitted to the MCU 5.

The balancing circuit 4 selectively charges an optional one (s) of the battery cells 2a based on a control signal outputted from the battery monitor AFE(s) 6. The battery 2 each has a positive (+) electrode and a negative (−) electrode.

Power supply of the battery 2 is connected to be supplied to a motor control unit 7 for inverter-controlling for controlling driving of a three-phase motor M mounted on a vehicle such as an EV or HEV and to the balancing circuit 4. The battery 2 is charged by a DC power supply 8 that is an external charger or regenerative power by the motor M during running; in addition, upon driving the motor M, energy is released from the positive (+) electrode and the negative (−) electrode.

In addition, the MCU 5 communicates with an ECU (Electric control unit) 9 for controlling the battery system 1. Ona vehicle, in addition to the ECU 9, a large number of ECUs (not illustrated) for variously controlling the motor M, a power train system such as an engine, an information system such as a navigation system and audio system, or a body system such as air conditioner, front light, door lock, etc.

As a protocol of a communication network for connecting the MCU 5 and the ECU 9, for example, the CAN mentioned above is used. The MCU 5 is connected to a CAN bus BC via a CAN transceiver/receiver 10. In addition, the ECU 9 is connected to the CAN bus BC via a CAN transceiver/receiver 11. Other ECUs are connected to the CAN bus BC via CAN transceivers/receivers (not illustrated) in the same manner.

To the CAN bus BC, a differential signal of the CAN protocol is transferred. The CAN transceiver/receiver 10 converts the differential signal inputted via the CAN bus BC to a digital signal and outputs the same to the MCU 5 and also converts the digital signal outputted from the MCU 5 to a differential signal and outputs the same to the CAN bus BC.

The MCU 5 is formed of SPIs (Serial Peripheral Interfaces) 12, a CPU 13, a CAN interface 14, a memory 15, and so forth. The SPIs 12 are interface for performing serial communications and communicate with the battery monitor AFEs 6 via digital isolators DI. The CPU 13 is for controlling operations of the MCU 5.

The CAN interface 14 is an interface between the MCU 5 and the CAN bus BC. The memory 15 is formed of, for example, a RAM (Random Access Memory) or a ROM (Read Only Memory). The RAM is used as, for example, a work area of the CPU 13. In the ROM, for example, an operation program of the MCU 5 is stored.

<Configuration Example of Battery Monitor AFE>

FIG. 2 is an explanatory diagram illustrating an example of a configuration of the battery monitor AFE 6.

The configuration includes an analog multiplexer 16, an A/D converter 17, SPIs 18 and 19, a register group 20, level shifters 21 and 22, a discharge control unit 23, a charge control signal output unit 23a, and a regulator 24.

Also, to the battery monitor AFE 6, external terminals C12 to C0, B12 to B1, D12 to D1, SDO, SCLK, SSO, etc. are provided. The charge control unit 23 is formed of a plurality of resistors R1 and a plurality of transistors T1.

In addition, the charge control signal output unit 23a is formed of a plurality of resistors R2 and a plurality of transistors T2. The transistors T1 and T2 are formed of, for example, N-channel MOSs (Metal Oxide Semiconductors).

Between the external terminals C12 to C0, the resistor R1 and the transistor T1 in the charge control unit 23 are connected in series, respectively. In addition, between the external terminals C12 to C0, the resistor R2 and the transistor T2 of the charge control signal output unit 23a are connected in series, respectively.

For example, between the external terminal C12 and the external terminal C11, the resistor R1 and the transistor T1 connected in series is connected in parallel with the resistor R2 and the transistor T2 connected in series. The external terminals C11 to C0 are in the same connection configuration.

In addition, a connection portion of the resistor R1 and the transistor T1 is connected to each of the external terminal D12 to D1, and a connection portion of the resistor R2 and the transistor T2 are connected to each of the external terminals B12 to B1.

The battery cell 2a of the battery 2 is connected to each of the external terminals C12 to C0, and a resistor Rr for discharging is connected to each of the external terminals D12 to D1.

In addition, the external terminals B12 to B1 are connected to the balancing circuit 4 so that the control signals for controlling operation of the balancing circuit 4 is inputted to the balancing circuit 4, respectively.

The external terminal SDI is a terminal through which a serial signal from the outside is inputted to the SPI 19 and the external terminal SCLKI is a terminal through which synchronous clock of the serial signal is supplied to the SPI 19. The external terminal SDO is a terminal through which the serial signal is outputted from the SPI 18 to the outside, and the external terminal SCLKO is a terminal through which the synchronous clock of the serial signal is outputted from the SPI 18 to the outside.

The external terminal SSO is a terminal through which a select signal is outputted from the SPI 18. To the analog multiplexer 16, the power supply voltage VCC is connected to be supplied. The power supply voltage VCC is a power supply voltage generated by the DC step down converter 32 that will be described later.

The analog multiplexer 16 selects a voltage value of an optional one of the battery cells 2a based on a select signal and outputs the voltage value to the A/D converter 17. The A/D converter 17 carries out an A/D conversion of the voltage value outputted via the analog multiplexer 16 and outputs the same to the register group 20.

The select signal inputted to the analog multiplexer is outputted from the ECU 9 and inputted to the control terminal of the analog multiplexer 16 via the SPI 19, register group 20, and the A/D converter 17.

To the register group 20, a plurality of registers REG are provided. The register group 20 temporarily stores digital data as A/D converted by the A/D converter 17, control data outputted from the ECU 9, or the like.

In addition, to the registers of the register 20, information for specifying the battery cell(s) 2a from inputted address information is stored. Based on the address information outputted from the ECU 9 etc., an optional one of the battery cells 2a is specified and the battery cell 2a is discharged or charged.

To discharge the battery cell 2a, the transistor specified by the address information outputted from the ECU 9 is turned on to discharge energy of the optional battery cell 2a to the externally connected resistor for discharge Rr.

Further, in the register REG, charging cell specifying information for specifying the battery cell 2a to be charged from the inputted address information is stored. To charge the battery cell 2a, based on the address information outputted from the ECU 9, the charging cell specifying information is searched and the transistor specified by a result of the search is turned on to output the control signal to the balancing circuit 4, thereby charging the optional battery cells 2a by the balancing circuit. The regulator 24 generates a power supply voltage VREG (e.g., about 5.0 V) by stepping down the power supply voltage VCC.

<Operation Example of Battery System 1>

An operation example of the battery system 1 will be described.

The battery system 1 is controlled by the ECU 9 via the CAN bus BC as described above. The MCU 5 controlling the battery 2 outputs, upon receiving a request from the ECU 9, instructions to the battery monitor AFE 6. The battery monitor AFE 6 is connected in a daisy chain connection by the SPIs 18 and 19 and instructions from the MCU 5 is transmitted by the serial signal.

In addition, in the battery monitor AFE 6, voltage at each of the battery cells 2a of the battery 2 is inputted to the A/D converter 17 via the analog multiplexer 16. A voltage value as A/D converted is inputted to the ECU 9 via the register group 20, SPI 18 and MCU 5 and the ECU 9 measures a cell voltage of the optional battery cell 2a. The battery cell 2a the voltage of which is outputted to the analog multiplexer 16 is determined by the select signal outputted from the ECU 9 as described above.

In the cell balancing control of the battery 2, when there is a battery cell about which the ECU 9 determines that the cell voltage is high, the ECU 9 outputs an address signal for discharging the subject battery cell to the battery monitor AFE by a serial signal.

The battery monitor AFE 6 search for information stored in the register REG of the register group 20 based on the address signal outputted from the ECU 9, specifies a battery cell to discharge, and outputs a signal for selecting the subject transistor T1.

The signal outputted from the register REG is inputted to the subject transistor T1 via a level shifter 21, and as the transistor T1 is turned ON, the battery cell is selectively discharged via the external resistor Rr connected to the external terminal Dn.

Further, in the cell-balancing control of the battery 2, when the ECU 9 detects the battery cell(s) 2a having a low cell voltage, the ECU 9 outputs the address information so as to operate the balancing circuit 4.

The battery monitor AFE 6 searches charging cell specifying information stored in the register REG based on the address information outputted from the ECU 9, specifies an optional battery cell 2a to charge, and outputs a signal for selecting the subject transistor T2 corresponding to the specified battery cell 2a.

The signal outputted from the register REG is inputted to the subject transistor T2 via the level shifter 22. Then, as the transistor T2 is turned ON, an ON/OFF signal is outputted to the balancing circuit 4 via the external terminal Bn. The balancing circuit 4 selectively charges an optional battery cell based on the inputted ON/OFF signal.

<Reason of Cell Balancing>

A reason of uniforming cell voltages of the battery cells (cell balancing) will be explained.

First, there are usable maximum voltage and minimum voltage for the battery cells and they should be used between them (called "operating voltage").

Figure 3A:
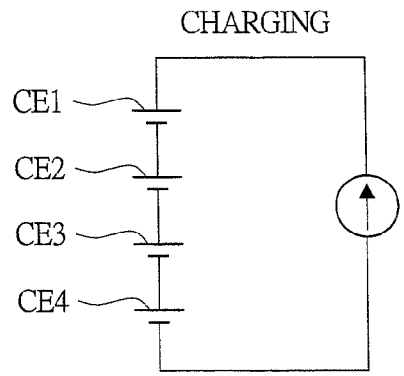
FIGS. 3A to 3C are explanatory diagrams illustrating a mechanism of reducing power of a battery cell upon charging.
Figure 3B:
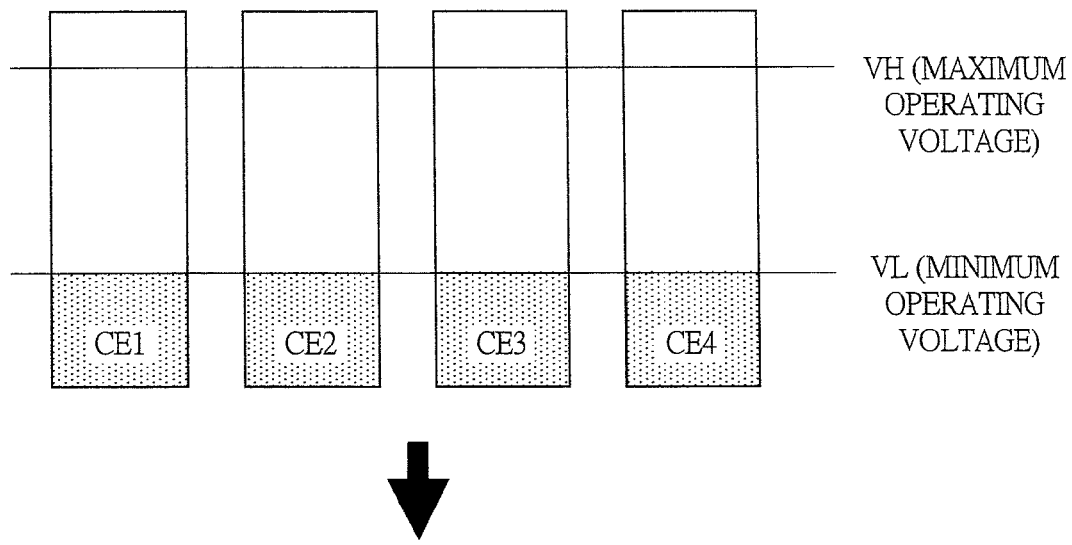
Figure 3B:
Figure 3C:
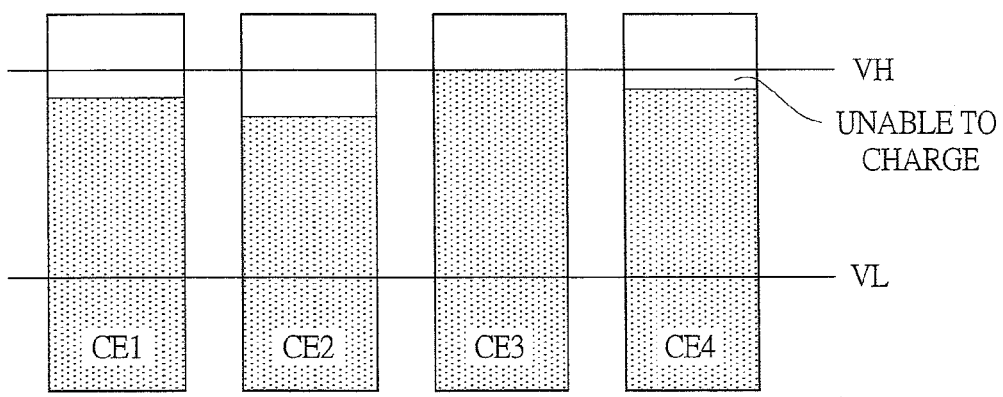

In addition, there is individual variability in the discharge capacity of the battery cells. For example, as illustrated in FIG. 3A, a battery in which battery cells CE1 to CE4 are connected in series is charged. Here, as illustrated in FIG. 3B, assuming that discharge capacities of respective battery cells are in a relationship of CE3<CE4<CE1<CE2, as illustrated in FIG. 3C, the voltage of the battery cell CE3 having a small discharge capacity is rapidly increased and quicker to reach the high limit of the operating voltage. If it is leaved at it is, further charging is not available and thus other battery cells than those which have reached the high limit of the operating voltage will not be fully charged.

Subsequently, discharging by load will be explained. As illustrated in FIG. 4A, in the battery in which the battery cells CE1 to CE4 are connected in series, as illustrated in FIG. 4B, assuming that the discharge capacities of each battery cells are in a relationship of CE3<CE4<CE1<CE2, as illustrated in FIG. 4C, the cell voltage of the battery cell CE3 having the smallest discharge capacity is rapidly lowered and reaches the low limit of the operating voltage.

As the battery (as a whole), although it cannot be discharged anymore, here, other battery cells CE1, CE2, and CE4 still maintain dischargeable states.

Thus, almost all the battery cells can be fully charged when charges of the battery cells at high voltages are discharged upon charging and summing respective cell voltages. In addition, not only upon charging the battery 2 but also upon using (discharging) the battery 2, by uniforming respective cell voltages using the balancing circuit 4, it is possible to discharge without wasting.

<Principle Circuit Example of the Balancing Circuit>

FIG. 5 is an explanatory diagram illustrating a principle of the balancing circuit 4 provided in the battery system 1.

The balancing circuit 4 is formed of, as illustrated, a plurality of DC converters 25, a switching element 26, and a transformer 27. To the DC converters 25, the positive (+) electrodes and negative (−) electrodes of the battery cells 2a of the battery cell sets 2b are connected, respectively.

To one of ends of a primary winding of the transformer 27, the positive (+) electrode of the battery cell set 2b is connected, and to the other end of the primary winding of the transformer 27, one of connection portions of thee switching element 26 is connected.

To the other connection portion of the switching element 26, the negative (−) side electrode of the battery cell set 2b is connected. The switching element 26 is turned on/off based on pulse signals at a constant cycle.

In addition, to the transformer 27, a plurality of secondary windings are provided and these secondary windings are connected to the plurality of DC converters 25, respectively. To the DC converter 25, an induction voltage generated by the secondary winding of the transformer 27 is supplied.

Further, to output portions of the DC converters 25, the battery cells 2a are individually connected, respectively. The DC converters 25 convert and output a voltage generated by the secondary winding of the transformer 27 to an optional direct voltage. Operations of the DC converters 25 are controlled based on the ON/OFF signals outputted from the battery monitor AFE 6, respectively.

An operation example of the balancing circuit 4 illustrated in FIG. 5 will be described.

Energy is extracted from the whole of the battery 2 through the switching element and the primary winding of the transformer 27.

In the simplest operation example, the switch is turned ON/OFF (switching) with a constant cycle and a constant pulse width as described above. The polarity of the secondary winding of the transformer 27 depends on the type of the converter connected to the battery cells 2a.

A transformer of a forward type has the same polarity as the primary winding, and a transformer of a flyback type has the opposite polarity. Here, although the forward type or fly-back type in a narrow sense will be described to facilitate descriptions, the type is not limited to these and various power supply systems are possible. It is needless to say that, for example, as the forward type, push-pull, half-bridge, full-bridge, and other systems are included and also needless to say that the flyback system includes an RCC (ringing choke inverter) system and others.

However, the DC converter 25 includes at least one or more saturable inverters and is a so-called magamp (magnetic amplifier) converter having a controllable pulse width of a secondary voltage according to characteristics of the saturable inductors.

Further, an output voltage of the DC converter 25 is controlled to be a certain voltage (mostly, close to a maximum value of the operating voltage of the battery cells). The DC converter 25 is operated when the ON/OFF signal outputted from the battery monitor AFE 6 is activated.

By operating the DC converter 25 selectively by the ON/OFF signal, it is optimum for quickly charging battery cells at low voltages. Particularly, upon discharging the battery 2, discharging time of the battery 2 can be improved as rapidly as possible by concentrically charging battery cells having drastically lowered voltages.

Note that, according to characteristics of the DC converter 25, the larger the difference between the voltages of the battery cells and the controlled certain voltages is, the more current flows; thus, even when all the cells are selected, voltage differences among the battery cells are reduced.

FIG. 6 is an explanatory diagram illustrating a modification example of the balancing circuit illustrated in FIG. 5.

Although the balancing circuit illustrated in FIG. 5 has had a configuration in which one transformer 27 is provided, in FIG. 6, the number of transformers 27a provided is the same as the number of the battery cells 2a in the battery 2.

To one end of a primary winding of the transformer 27a, the positive (+) electrode of the battery 2 and one of the connection portions of the switching element 26 are connected. In addition, to the other connection portion and to the other end of the primary winding of the transformer 27a, the negative (−) electrode of the battery 2 is connected. Since other circuit configurations and connections are the same as those in FIG. 5, descriptions thereof will be omitted.

In the case of the balancing circuit 4 in the configuration as illustrated in FIG. 5, although there is no problem when the number of the battery cells is a few (e.g., about 4 cells), batteries used in EVs etc. are made to be high-voltage in view of weight saving and loss reduction and thus the number of battery cells is, for example, about 96 and it is large.

In this case, as to the transformer 27 in FIG. 5, the number of windings of the secondary winding is too large and thus its leakage inductance is large, posing efficiency deterioration.

However, as illustrated in FIG. 6, when the number of the transformers 27a provided is the same as that of the battery cells 2a, the number of the secondary winding is one and thus a transformer with very excellent coupling is made, thereby significantly reducing the leakage inductance etc.

FIG. 7 is an explanatory diagram illustrating another modification example of the balancing circuit 4 as illustrated in FIG. 6.

In this case, in the configuration of the balancing circuit 4 illustrated in FIG. 7, the switching element 25 is omitted from the configuration of the balancing circuit 4 in FIG. 6 and a DC/AC converter 28 is newly added to the configuration of the balancing circuit 4 in FIG. 6.

To the DC/AC converter 28, the positive (+) electrodes and negative (−) electrodes of the battery 2 are connected, respectively, and the DC/AC converter 28 converts a DC voltage supplied from the battery 2 to an AC voltage and outputs the AC voltage.

To an output portion of the DC/AC converter 28, one end of primary windings of the transformers 27a are connected, respectively, and, to the other end of the primary wirings of the transformers 27a, the negative (−) electrodes of the battery 2 are connected, respectively. Since the other circuit configurations and connections are the same as those in FIG. 6, descriptions thereof will be omitted.

The DC/AC converter 28 generates an AC voltage from the power supply (DC voltage) of the battery 2. The DC/AC converter 28 generates an AC voltage from the power supply (DC voltage) of the battery 2. The DC/AC converter 28 outputs an AC voltage waveform to be an optimum driving waveform to the DC converter 25.

The DC/AC converter illustrated in FIG. 7 is called inverter also, and there are various DC/AC conversion technologies; however, when converting to an AC voltage that is different from an input voltage, it is general to perform a DC/AC conversion after once stepping up to a desired voltage by a DC/DC converter.

The reason is that performing DC/DC conversion before DC/AC conversion can be more efficient and it can convert to an optimum voltage/frequency. Thus, the configuration may be such that a DC/DC converter is provided to a former stage of the DC/AC converter 28.

In this manner, by providing the DC/AC converter 28, it is possible to supply optimum frequency, pulse width, and voltage to the DC converters 25 to charge the battery cells 2a and thus design freedom of the DC converter 25 can be improved and an efficiency improvement and cost reduction can be possible.

FIG. 8 is an explanatory diagram illustrating still another modification example of the balancing circuit 4 in FIG. 6.

In this case, in the configuration of the balancing circuit 4 in FIG. 6, a DC/DC converter 29 is newly provided. To the DC/DC converter 29, the positive (+) electrodes and negative (−) electrodes of the battery 2 are connected, respectively, and a DC voltage supplied from the battery 2 is converted to an optional DC voltage and outputted.

To an output portion of the DC/DC converter 29, one end of primary windings of the transformers 27a are connected, respectively, and to the other end of the primary windings of the transformer 27a, the negative (−) electrodes of the battery 2 are connected, respectively. Since the other circuit configurations and connections are the same as those in FIG. 6, descriptions thereof will be omitted.

Since the DC/DC converter 29 for converting the voltage of the battery 2 is, for example, a charge supply source of a large number of battery cells, i.e., about 100 cells, the power output is large; thus, in view of efficiency, switching power supply is needed.

When the voltage at the input is high and a high power is outputted, an optimum switching frequency is often about several tens of kHz although it depends on the power supply. In addition, since it is only necessary for the DC converter 25 to charge one battery cell, power of the DC converter 25 is low.

Further, since the DC converters 25 having the same circuit configuration are provided only to the number of battery cells, the DC converters 25 are desired to be small and light. Thus, the switching frequency of the switching element 26 is preferable to be about 100 kHz or higher.

In this manner, also in the configuration of the balancing circuit 4 illustrated in FIG. 8, by the DC/DC converter 29, optimum frequency, pulse width and voltage can be supplied to the DC converter 25 and thus it is possible to enhance the design freedom of the DC converter 25 and efficiency improvement and cost reduction are possible.

<Specific Example of the Balancing Circuit used in the Battery System>

FIG. 9 is an explanatory diagram illustrating an example of a specific circuit configuration of the balancing circuit 4.

Here, to the battery system 1, eight battery monitor AFEs 6 are provided and thus the total number of the battery cells in the battery 2 is 96. Thus, twelve battery cells 2a are monitored by one battery monitor AFE 6.

In the configuration of the battery cell set 2b formed of twelve battery cells, when a rated voltage of one battery cell is about 3.6 V, voltage of the battery cell set 2b is about 43.2 V.

And, in FIG. 9, the balancing circuit 4 being illustrated is a configuration of the part three battery cells 2a at the top and bottom are connected among the twelve battery cells 2a composing one battery cell set 2b connected to one battery monitor AFE 6.

The balancing circuit 4 is formed of a plurality of DC converters 30, a pulse voltage generator unit 31, and a DC step-down converter 32. To an output terminal BCP of the DC converter 30, each of the positive (+) electrodes of each battery cell 2a is connected, and to an output terminal BCN of the DC converter 30, each of the negative (−) electrodes of each battery cell 2a is connected.

In addition, to a control terminal EBL_B provided to the DC converter 30, an ON/OFF signal outputted from the battery monitor AFE 6 is inputted in the connection. The ON/OFF signal is a control signal for controlling operations of the DC converter 30.

The DC converter 30 operates or halts based on the ON/OFF signal as described above. The pulse voltage generator unit 31 is formed of a plurality of pulse voltage generating circuits 31a and a pulse signal generating circuit 31b.

The pulse voltage generating circuit 31a generates a DC voltage based on a pulse signal generated by the pulse signal generating circuit 31b. The DC voltage generated by the pulse voltage generating circuit 31a is supplied to each of the DC converters 30.

To the DC step-down converter 32, a voltage VBATT supplied via a terminal VIN1 and a power supply voltage VREG generated by the regulator 24 via a terminal VIN2 are supplied, respectively.

The DC step-down converter 32 generates a power supply voltage VCC by stepping down the voltage VBATT. The voltage VBATT is a power supply voltage supplied from the battery cell set 2b connected to one battery monitor AFE 6.

The generated power supply voltage VCC is supplied to each of the pulse voltage generating circuits 31a via a terminal VOUT1 of the DC step-down converter 32 and a terminal VIN3 provided to each of the pulse signal generating circuits 31a.

The pulse signal generating circuit 31b is formed of, for example, an oscillation circuit such as an oscillator, the pulse signal generating circuit 31b generating a pulse signal at an optional cycle and outputs the same to a pulse signal input terminal IN of the pulse voltage generating circuit 31a.

The pulse voltage generating circuits 31a generate pulse voltages based on the pulse signal generated by the pulse signal generating circuit 31a, respectively, and supply the pulse voltages generated via an input portion PIN of the DC converter 30 from output terminals P03 to P01, respectively.

FIG. 10 is an explanatory diagram illustrating an example of the DC converter 30 provided to the balancing circuit 4 in FIG. 9.

The DC converter 30 is formed of resistors RR1 to RR2 and R3 to R4, an operational amplifier OP1, transistors TT1 and TT2, a capacitor C1, diodes D1 and D2, an inductor L1, and saturable inductor L2. The transistor TT1 is formed of, for example, a PNP bipolar transistor and the transistor TT2 is formed of an NPN bipolar transistor.

To one end of the saturable inductor L2, the input terminal PIN is connected, and to the other end of the saturable inductor L2, an anode of the diode D2 and a collector of the transistor TT1 are connected, respectively.

To a cathode of the diode D2, a cathode of the diode D1 and one end of the inductor L1 that is a choke coil are connected, respectively. To the other connection portion of the inductor L1, one of connection portions of the capacitor C1 and an output terminal BCP are connected, respectively.

To a base of the transistor TT1, a collector of the transistor TT2 and one of connection portions of the resistor R4, respectively. To an emitter of the transistor TT1, the other connection portion of the resistor R4, one of connection portions of the resistor RR2, and the output terminal BCP are connected, respectively.

To the other connection portion of the resistor RR2, one of connection portions of the resistor R3 is connected, and to these connection portions of the resistors RR2 and R3, a positive (+) input terminal of the operational amplifier OP1 and one of connection portions of the resistor RR1, respectively. To the other connection portion of the resistor RR1, a control terminal EBL_B is connected.

In addition, to a negative (−) input terminal of the operational amplifier OP1, a reference voltage VREF is inputted, and to an output terminal of the operational amplifier OP1, a base of the transistor TT2 is connected. In addition, a shunt regulator is formed of the operational amplifier OP1 having the negative (−) input terminal inputted with the reference voltage VREF and the transistor TT2.

Further, the output terminal BCN is connected to an anode of the diode D1, the other connection portion of the capacitor C1, an emitter of the transistor TT2, and the other connection portion of the resistor R3, respectively.

FIG. 11 is an explanatory diagram illustrating an example of the pulse voltage generating circuit 31a provided to the balancing circuit 4 in FIG. 9.

The pulse voltage generating circuit 31a is formed of three transformers 33, three transistors T3 formed of N-channel MOSs, three diodes D3, and a buffer B1. To one end of a primary winding of the transformer 33 and the buffer B1, a power supply voltage VCC is supplied in the connection.

In addition, to the other end of the primary winding of the transformer 33, one of connection portion of the transistor T3 and a cathode of the diode D3 are connected, respectively. To the other connection portion of the transistor T3 and an anode of the diode D3, a reference potential VSS is supplied in the connection.

To an input portion of the buffer B1, via a pulse signal input terminal IN, the pulse signal generated by the pulse signal generating circuit 31a is inputted in the connection. To an output portion of the buffer B1, gates of the transistors T3 are connected, respectively.

To one side of ends of secondary windings of the transformers 33, output portions P03 to P01 are connected, respectively, and to the other ends of the secondary windings of the transformers 33, output portions BCN3 to BCN1 are connected, respectively.

An output terminal PO and an output terminal BCN of the pulse voltage generating circuit 31a are connected to the input terminal PIN of the DC converter 30 and the input terminal BCN, respectively, so that the DC voltage generated by the pulse voltage generating circuit 31a is supplied to the DC converter 30 in the connection.

In addition, FIG. 12 is an explanatory diagram illustrating an example of a configuration of the DC step-down converter 32 provided to the balancing circuit 4 in FIG. 9.

The DC converter 32 is formed of a PWM control unit 34, diodes D6 to D9, an inductor L3, a transistor T6, a capacitor C2, resistors R6 and R5, and a transformer 35. The transistor T6 is formed of, for example, an N-channel MOSFET (Metal Oxide Semiconductor Field Effect Transistor).

To one of connection portions of the resistor R6, one of connection portions of the capacitor C2, and one of ends of the inductor L3, a terminal VOUT1 is connected, and the power supply voltage VCC generated by the DC step-down converter is outputted via the terminal VOUT1.

To the other connection portion of the resistor R6, one of connection portion of the resistor R5 is connected, and to the other connection portion of the resistor R5, a reference potential VSS is connected. To the other end of the inductor L3, cathodes of the diodes D8 and D9 are connected, respectively.

To an anode of the diode D8, an end of a primary winding of the transformer 35 is connected. To one end of a secondary winding of the transformer 35, a cathode of the diode D6 is connected, and to a middle point of the secondary windings of the transformer 35, a terminal VIN1 is connected.

To the terminal VIN1, a power supply voltage VBAT supplied from the battery cell 2 is supplied in the connection. To the other end of the secondary winding of the transformer 35, one of connection portions of the transistor T6 and a cathode of the diode D7 are connected, respectively.

To a gate of the transistor T6, an output portion of the PWM control unit 34 is connected, and the transistor T6 performs ON/OFF (switching) operation based on a PWM signal DRV outputted from the PWM control unit 34.

To the PWM control unit 34, a power supply voltage VREG generated by the regulator 24 is supplied to a terminal VIN2 as an operating power supply. To a control terminal REMOTE of the PWM control unit 34, a control signal from the MCU 5 is inputted in the connection, and the PWM control unit 34 operates based on the control signal.

By providing the control terminal REMOTE, for example, by outputting a control signal for stopping operation from the MCU 5 (or the battery monitor AFE), when cell-balancing (charging to the battery cells) is not needed, the DC step-down converter 32 can be stopped; thus, consumption current can be reduced and dischargeable time can be increased.

In addition, to a feedback terminal FB of the PWM control unit 34, the connection portions of the resistor R6 and the resistor R5 are connected. According to a voltage generated by resistance division by the resistors R6 and R5, the PWM control unit 34 is capable of varying duty of the PWM signal DRV so that a voltage level of the power supply voltage VCC is substantially constant.

Note that, the power supplied to the terminal VIN2 may be the other one than the power supply voltage VREG and may be supplied by, for example, direct supply from the battery cell set 2b, self-supply with a dedicated winding in the transformer 35 or a small auxiliary power supply called AUX etc.

<Operation of the Balancing Circuit>

The DC step-down converter 32 is formed of a forward converter as illustrated in FIG. 12. When the control signal from the MCU 5 is inputted via the control terminal REMOTE, the PWM control unit 34 operates and a PWM signal is outputted. When the transistor T6 is turned ON (conducted) based on the PWM signal, the diode D8 is forward-biased and current flows toward the inductor L3, thereby supplying load current to VCC at the same time as accumulation of electric energy in the inductor L3 and the capacitor C2.

Subsequently, when the transistor T6 is turned OFF (cutoff), a feedback flow to the diodes D8 and D9 is generated to a reverse electromotive force of the inductor L3, reducing a current value of the inductor; however, load current is being kept flowed to VCC. Before the current value of the inductor becomes zero, by turning the transistor T6 again, current starts flowing in the inductor L3 again, putting the DC step-down converter 32 in an operating mode, thereby generating the power supply voltage VCC.

The power supply voltage VCC generated by the DC step-down converter 32 is supplied to the pulse voltage generating circuits 31a in FIG. 11, respectively, as described above. In the pulse voltage generating circuit 31a, based on the pulse signal generated by the pulse signal generating circuit 31b, each transistor T3 is turned ON/OFF (switching) to supply the pulse signal generated on the secondary winding side of the transformer 33 to the DC converter 30, respectively.

In the DC converter 30 in FIG. 10, as described above, the secondary winding of the transformer 33 is connected to the saturable inductor L2. The saturable inductor L2 has such a characteristic that an inductance of its coil being large when the current is smaller than a certain value, and being as close as zero when the current is larger than the certain value and an inductance value of the coil is changed depending on the magnitude of the current using the characteristic. In addition, the connection configuration after the saturable inductor L2 is a forward converter of so-called magamp (magnetic amplifier) system.

The DC step-down converter 32 preferably has a switching frequency at about 40 kHz for emphasizing efficiency. A winding ratio of the transformer 35 in the DC converter 30 that is a mag-amp type forward converter is set so that, for example, a voltage between drain and source of the transistor T6 is about 20 V in consideration of a withstand gate voltage of the transistor T6 etc.

In addition, the switching frequency of the transistor T6 is set to, for example, about 100 kHz for downsizing the transformer 35 and saturable inductor L2. Since the winding ratio of the transformer 35 is, for example, 2:1, a peak value of the secondary side is about 10 V. A pulse width (primary ON time) is about 5 μs including a margin.

Further, the resistor R1 to R3 are set so that, in the case of having the ON/OFF signal outputted from the battery monitor AFE 6 is at a Lo level (charging to the battery cells), voltage divided by a combined resistance of the resistor R1 and the resistor R2 and the resistor R3 is, for example, about 4.2 V; and in the case when the ON/OFF signal is at a Hi level (charging to the battery cells is stopped), the voltage is set to, for example, about 1.5 V.

<Operation of the DC Converter>

Hereinafter, operations of the DC converter 30 will be described using an explanatory diagram in FIG. 13 and a timing chart of FIG. 14.

FIG. 13 is a schematic diagram illustrating the DC converter 30 and a part of the pulse voltage generating circuit 31a. In addition, FIG. 14 illustrates a gate voltage VG of the transistor T3, a voltage V2nd between the secondary windings of the transformer 33, a voltage VREC across the diode D1 when the dividing resistance of the resistors R2 and R3 (hereinafter, called "voltage VINP") is smaller than the reference voltage VREF, the VREC when the voltage VINP and the reference voltage VREF are substantially equal, and the voltage VREC when the voltage VINP is larger than the reference voltage VREF.

First, when it is determined that there is a battery cell to which charging is needed, the ECU 9 outputs address information to the battery monitor AFE 6 via the MC5. The subject battery monitor AFE 6 turns on the transistor T2 specified by the address information to output the ON/OFF signal at the Lo level to the balancing circuit 4, and an optional battery cell is charged by the balancing circuit 4.

Determination of charging of the battery cell is done such that, for example, when the rated voltage of the battery cell is 3.6 V, charging performed when the cell voltage is less than about 4.2 V. When the voltage of the battery cell is about less than 4.2 V, the voltage VINP inputted to the positive (+) input terminal of the operational amplifier OP1 is lower than the reference voltage VREF; thus, the output of the operational amplifier is outputted at the Lo level.

In this manner, since the transistor T2 is turned OFF and only little voltage is applied even when the saturable inductor L2 side connected to the transformer 33 is negative, the resistance of the saturable inductor L2 is substantially only the wiring resistance and charging is started at full duty (FIG. 14, VINP<<VREF).

Then, as the charging to the battery cells progresses, when the voltage of the battery cells becomes about 4.2 V and the voltage VINP becomes substantially the same as the reference voltage VREF, the output of the operational amplifier becomes Hi level. According to a signal at the Hi level, the transistor T2 and the transistor T1 are turned ON, respectively, thereby flowing current to the saturable inductor L2 side through the transistor T1.

In this manner, when the secondary winding of the transformer 33 is negative, the saturable inductor L2 is reset and current does not flow for a while even when the voltage of the secondary winding becomes positive again. Thus, an output duty of the saturable inductor L2 is decreased (FIG. 14, VINP=VREF).

Although the foregoing example is an extreme one, this is duty control principle of the mag-amp converter.

In this manner, in the case where the ON/OFF signal outputted from the battery monitor AFE is at the Lo level, when the voltage of the battery cell is lower than about 4.2 V, a battery cell at a low cell voltage is selectively charged and eventually the cell voltage is maintained at about 4.2 V. Thus, overcharging to the battery cells 2a can be prevented.

Meanwhile, when the ON/OFF signal is at the Hi level, the operational amplifier OP1 has a setting voltage of 1.5 V (voltage VINP) and a lowest voltage of the battery cell is about 2.0 V for example in a normal usage state; thus, the signal at the Hi level is always outputted (FIG. 14, VINP>>VREF). Thus, charging is not performed since reset of the saturable inductor L2 is being continued.

In this manner, by using the DC converter 30 formed of the mag-amp converter, it is possible to easily control charging by the ON/OFF signal outputted from the battery monitor AFE 6 and thus charging of the battery cells at a low voltage can be performed in short time.

In addition, since the ON/OFF signal is a signal of DC level and switching control etc. of the DC converter 30 is not performed, the ON/OFF signal is not a noise generating source to the battery monitor AFE; thus, reliability can be improved.

Since a maximum voltage generated by the DC converter 30 is managed and controlled by the saturable inductor L2, the operational amplifier OP1, and the reference voltage VREF, management of operating voltage of the battery cells being problematic to the active cell balancing method by a converter of Non-Patent Literature 1 is even solved.

Further, since there is no other input than the ON/OFF signal from the outside, control from the outside is simple and also added active elements are inductors or transformers, there is no extremely large inrush current and thus elements having a large ON resistance and being inexpensive can be used as the switching element (transistor T1); thus, the balancing circuit 4 can be composed inexpensively.

Moreover, since the setting voltage of the DC converters 30 is set near the maximum operating voltage, even when all of the DC converters 30 are in the ON state, each of the DC converters 30 is automatically stopped when the battery cells are charged to be close to the maximum operating voltage.

Consequently, according to the first embodiment, by the balancing circuit 4, the optional ones of the battery cells 2a can be efficiently charged in a short time and thus effective utilization ratio of the discharge capacitance of the battery cells 2a can be improved.

In this manner, the cruising range of EVs and HEVs can be enhanced and longer lifetime of the battery 2 can be achieved.

Moreover, since the balancing circuit 4 can be operated only by the ON/OFF signal according to instructions from the ECU 9, the balancing circuit 4 of a highly reliable active system can be achieved at a low cost.

Second Embodiment

Figure 15:
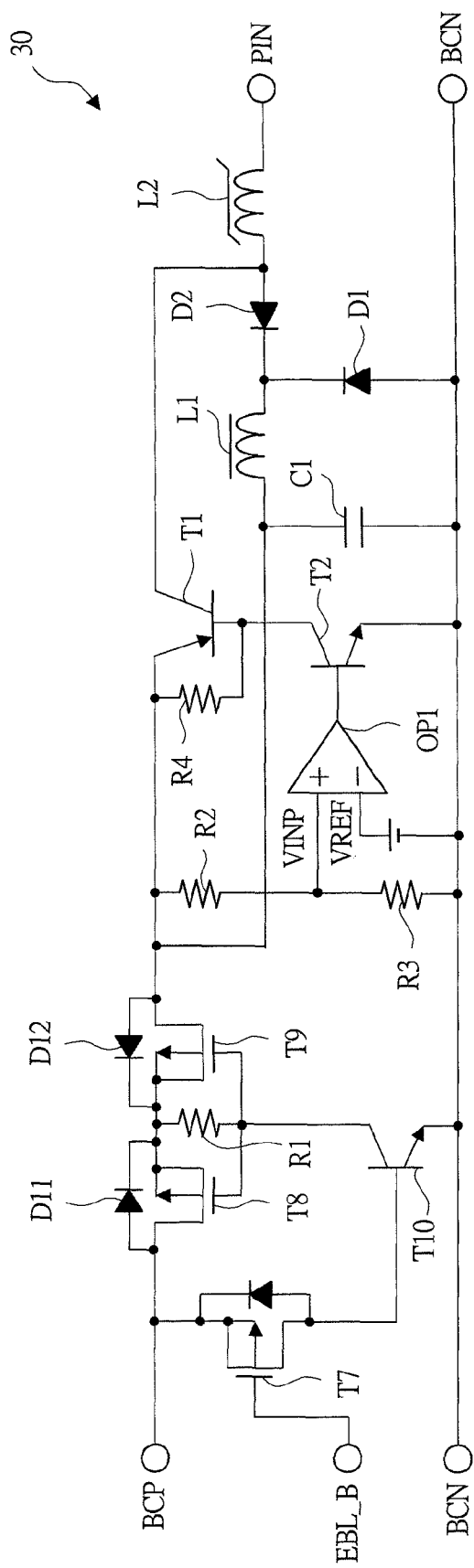
FIG. 15 is an explanatory diagram illustrating an example of a DC converter provided to the balancing circuit according to a second embodiment of the present invention.

FIG. 15 is an explanatory diagram illustrating an example of a DC converter provided to a balancing circuit according to a second embodiment of the present invention.

In the second embodiment, another example of the DC converter 30 as illustrated in FIG. 10 of the first embodiment will be described.

In the DC converter 30 illustrated in FIG. 10 of the first embodiment, since the resistors R1 to R3 and operational amplifier OP1 are always connected to the battery cells in the configuration, the battery cells are always in a discharging state.

Accordingly, in the second embodiment, the resistors R1 to R3 and the operational amplifiers are separated from the battery cells to cut off the discharging path in the configuration.

In this case, in the DC converter 30, as illustrated in FIG. 15, transistors T7 to T10, diodes D10 to D12 are newly added in the configuration of the DC converter 30 illustrated in FIG. 10. The transistors T7 to T9 are formed of, for example, P-channel MOSs and the transistor T10 is formed of, for example, an NPN bipolar transistor.

To one of connection portions of each of the transistors T7 and T8, the output portion BCP is connected, respectively, and to the other connection portion of the transistor T8, one of connection portions of the transistor T9 and one of connection portions of the resistor R1 are connected, respectively.

To the other connection portions of the resistor R1, gates of the transistors T8 and T9 and a collector of the transistor T10 are connected, respectively. To a base of the transistor T10 the other connection portion of the transistor T7 is connected, and to an emitter of the transistor T10, the output portion BCN is connected.

In addition, while the diodes D10 to D12 are connected to the transistors T7 to T9, respectively, all of the diodes are embedded diodes of MOSFETs. To the other connection portion of the transistor T9, one of connection portions of the inductor L1, one of connection portion of the capacitor C1, one of connection portions of each of the resistors R2 and R4, and an emitter of the transistor T1 are connected, respectively.

The other connection configurations of the resistors R1 to R4, the operational amplifier OP1, the transistors T1 and T2, the capacitor C1, the diodes D1 and D2, the inductor L1, and the saturable inductor L2 are the same as those in FIG. 10 of the first embodiment and thus descriptions thereof will be omitted.

In the case of the DC converter 30 in FIG. 15, when the ON/OFF signal at the Hi level is inputted, the transistors T8 and T9 are turned OFF and thus the resistors R1 to R3 and the operational amplifier can be electrically separated from the battery cell, thereby disabling discharge of the battery cell.

Further, the control signal from the MCU 5 is inputted to the control terminal REMOTE of the PWM control unit 34 to stop operation of the PWM control unit 34, thereby making current consumption of the balancing circuit 4 substantially zero.

Note that, in FIG. 15, while the transistors T7 to T10 are provided with the ON/OFF signal being Lo active, when the ON/OFF signal is Hi active, the number of transistors can be reduced.

In this manner, since the second embodiment can make discharge to the battery cell through the balancing circuit substantially zero when the balancing circuit 4 is not charging the battery cell, lifetime of the battery cell can be enhanced.

Third Embodiment

Figure 16:
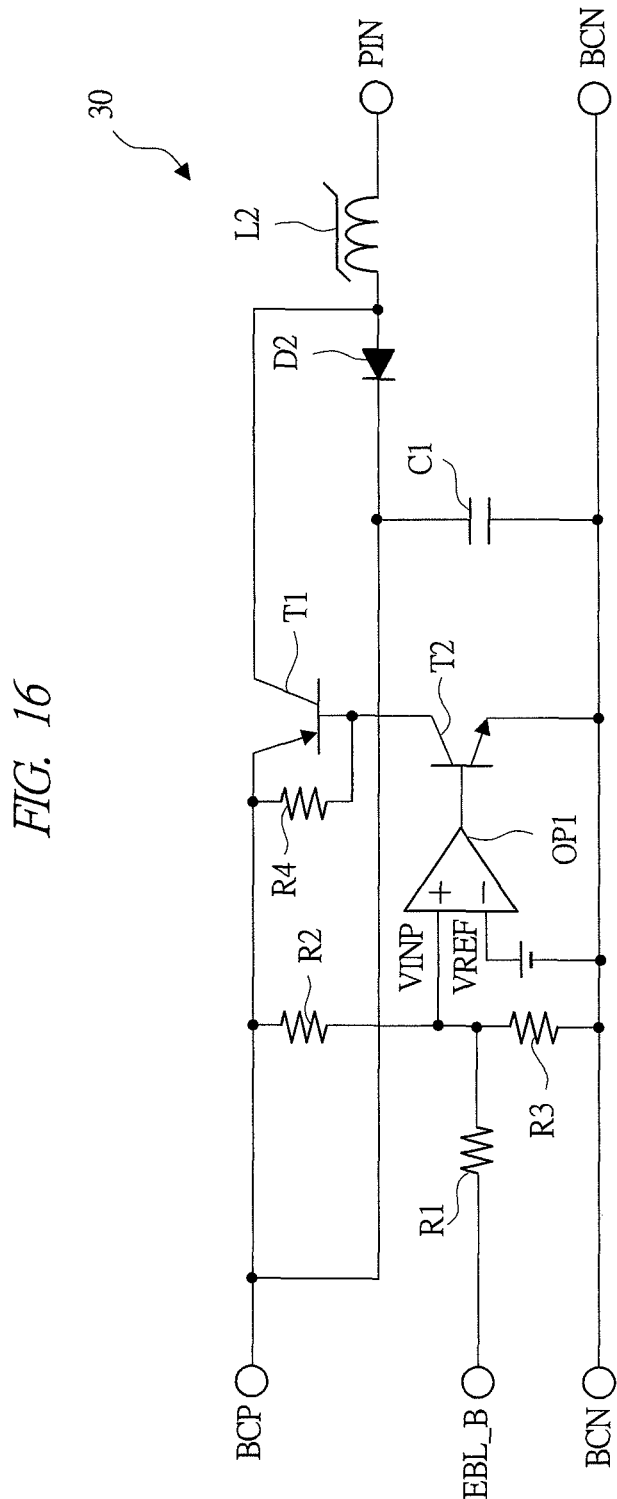
FIG. 16 is an explanatory diagram illustrating an example of a configuration of a DC converter provided to the balancing circuit according to a third embodiment of the present invention.

FIG. 16 is an explanatory diagram illustrating an example of a configuration of a DC converter provided to a balancing circuit according to a third embodiment.

In the first embodiment, the DC converter 30 has been a mag-amp type converter; however, in the third embodiment, using a flyback type of DC converter 30 will be described.

The DC converter 30 has such a configuration as illustrated in FIG. 16 that the inductor L1 and the diode D1 are omitted from the DC converter 30 in FIG. 10. The other circuit configurations are the same as those in FIG. 10 and thus descriptions thereof will be omitted.

In the flyback type, energy inflows into the primary winding and energy outputted from the secondary winding of the transformer are in the opposite phases to each other. Thus, polarity of the transformer 33 connected to the DC converter 30 is opposite in this connection.

By using the flyback type as the DC converter 30, reduction of parts of the DC converter 30 is possible.

Thus, when charging of the battery cells can be done with low power, using the flyback type enables area reduction of the balancing circuit 4 and cost reduction.

Fourth Embodiment

Figure 17:
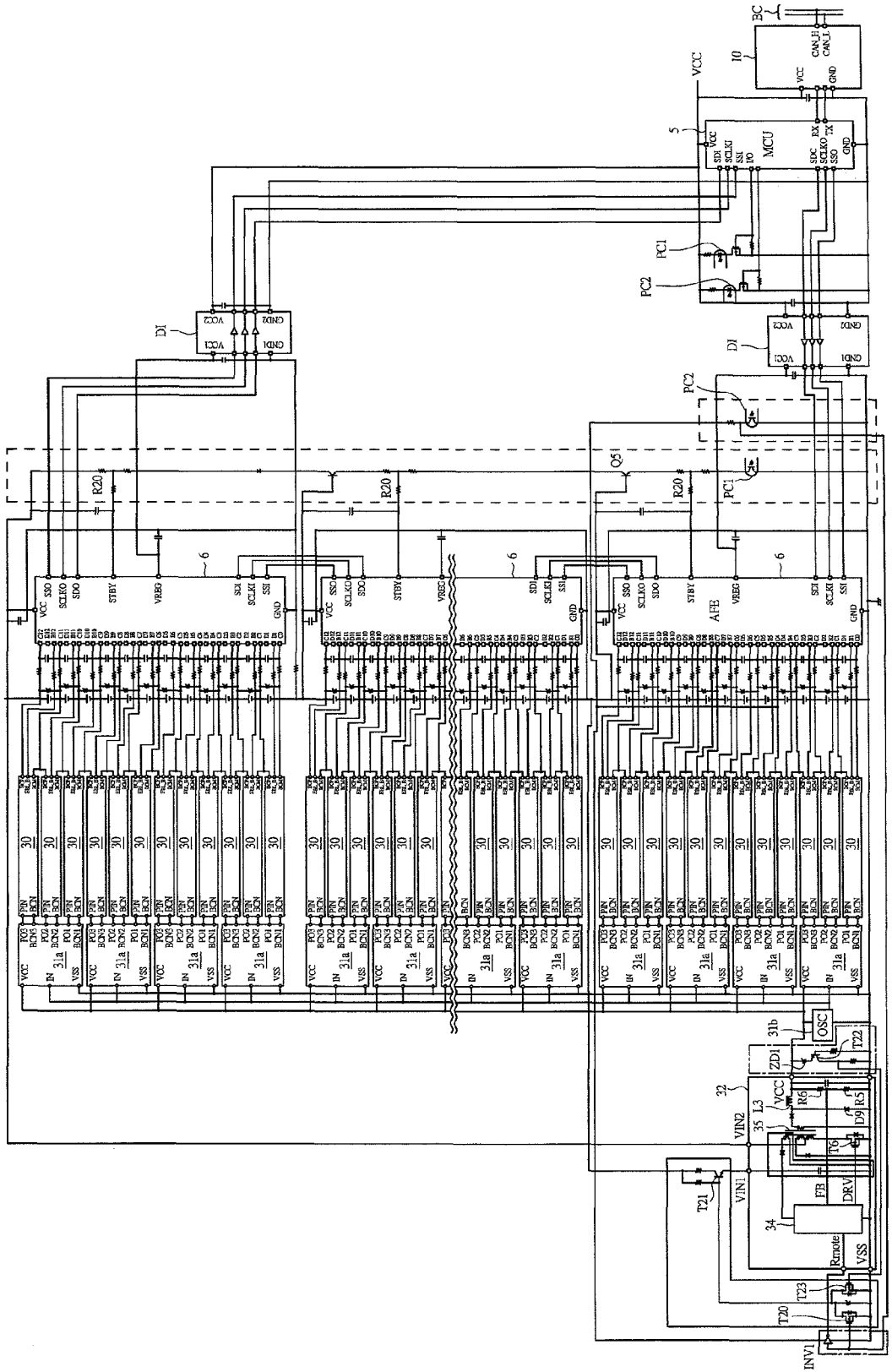
FIG. 17 is an explanatory diagram illustrating an example of a specific circuit configuration of a battery system according to a fourth embodiment of the present invention.
Figure 18:
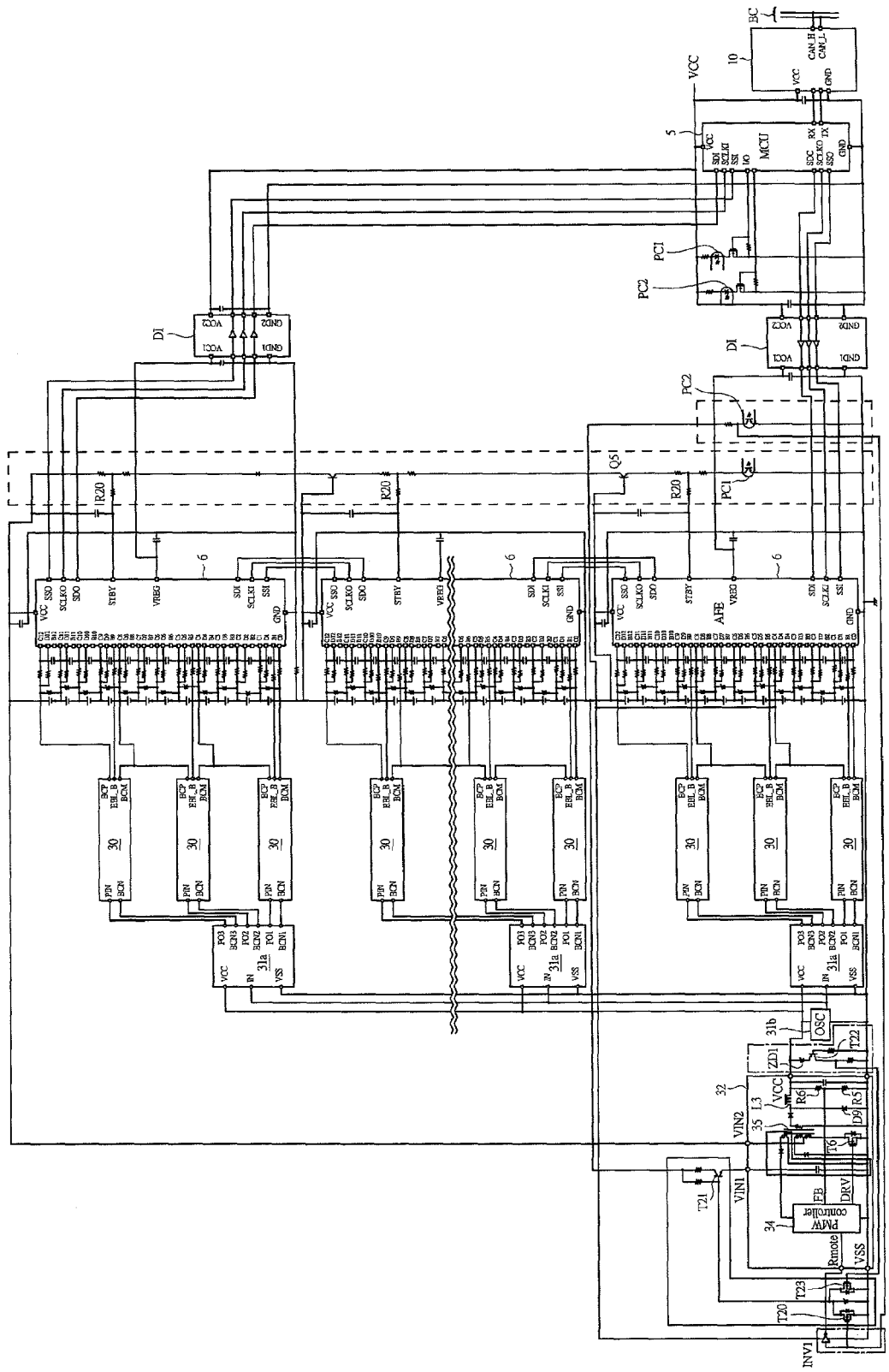
FIG. 18 is an explanatory diagram illustrating an example of a specific circuit configuration of a battery system according to a fifth embodiment of the present invention.

FIG. 17 is an explanatory diagram illustrating an example of a specific circuit configuration of a battery system according to a fourth embodiment of the present invention, and FIG. 18 is an explanatory diagram illustrating a modification example of FIG. 17.

<Features of the Battery System>

In the fourth embodiment, a specific example of the battery system 1 is illustrated in FIG. 17. Since the basic configuration is the same as that in FIG. 1 of the first embodiment, only distinguishing points of the battery system 1 in FIG. 17 will be picked up hereinafter.

1) The power supply voltage supplied to the PWM control unit 34 is self-excited. It is achieved by the circuit configuration illustrated by the dotted line in FIG. 17.

Hereinafter, albeit simply, operations will be described.

The MCU 5 as received instruction to start operation via the CAN bus BC turns ON a photocoupler PC1 via an I/O port. An output of the photocoupler PC1 is inputted to a standby terminal STBY of the battery monitor AFE 6 as a standby signal via a resistor R20, thereby activating the battery monitor AFE 6.

The battery monitor AFE 6 has a threshold near the of the power −2.5 V, and when a voltage of the standby signal inputted to the standby terminal STBY becomes larger than or equal to the threshold voltage, the battery monitor AFE 6 is operated at a voltage lower than the threshold voltage.

In addition, since the output current of the photocoupler PC1 is connected to the standby terminal STBY of the battery monitor AFE 6 at an upper level via the transistor T6 etc., all of the battery monitor AFEs 6 start operations at the same time.

A photocoupler PC2 is for insulating remote input of the PWM control unit 34. When the photocoupler PC2 is OFF, a collector potential (output) of the photocoupler PC2 is connected to a positive electrode of the fourth battery cell 2a and is at a potential there.

As a signal at the Hi level is inputted to the inverter INV1, the output thereof is at the Lo level and the PWM control unit 34 maintains stopped state regardless of with or without power supply. Here, since a transistor T20 that is an N-channel MOS is turned ON, reducing a gate voltage of the transistor T21 formed of an NPN bipolar transistor, the transistor T21 is turned OFF.

A main portion of consumption current here (when the DC step-down converter 32 is OFF) is a sum of an off leakage current of the transistor T6 for switching and a current corresponding to a base-collector resistance of the transistor T21 and a voltage of the fourth battery cell 2a that is a power source.

An OFF reel current of the transistor T6 is about 100 nA and the base-collector resistance of the transistor T21 is, when the minimum voltage of the fourth battery cell is 8 V and the maximum voltage of the fourth battery cell is about 16.8 V, only necessary to be able to flow 30 nA at 8V of the minimum operating voltage when hFE (direct current amplification factor) of the transistor T21 is 10000 and an activating current of the PWM control unit 34 is about 300 μA, and the OFF reel current is only 63 nA even at 16.8 V (in this case, resistance value is 133 MΩ). It is 840 nA at maximum for 20 MΩ with an allowance, and thus can be about lower than or equal to 1 μA.

When the photocoupler PC2 is turned ON, an output of the photocoupler PC2 is at the Lo level and a control signal at the Hi level is inputted to the control terminal REMOTE of the PWM control unit 34 via the inverter INV1.

In this manner, the state becomes operable when an operable power supply voltage VSTAT is supplied to the PWM control unit 34. Hereinafter, this voltage will be called VSTAT. Here, as the transistor T20 is turned OFF, a base current is supplied to the transistor T21 and VSTAT is supplied to the PWM control unit 34. Accordingly, the PWM control unit 34 is turned into an activated state and starts operation.

Next, at the same time of an increase of the voltage level of the power supply voltage VCC outputted from the DC step-down converter 32, via the transformer 35 and the diode D8, power of the PWM control unit is supplied.

Along with an increase of the power supply voltage VCC, as a Zener diode ZD1 and a transistor 22 that is a PNP bipolar transistor are turned ON, a transistor T23 that is an N-channel MOS is turned ON.

Since the transistor T21 is then turned OFF as a base current of the transistor T21 is gone, the power supply from the fourth battery cell is stopped (only the current made by the base-collector resistance of the transistor T21 mentioned above is left), supply from the transformer 35 via the diode D8 is left. Accordingly, wasting current extraction in the middle of the battery cell can be prevented.

2) As also illustrated in FIG. 1, the battery system 1 is connected to the CAN bus BC via the CAN transceiver/receiver 10 and controlled by the ECU 9.

3) The circuit for generating the standby signal (in the drawing, the circuit indicated by the two-dot chain line) has a configuration in which the battery monitor AFE 6 and the MCU 5 are insulated.

4) Also the circuit for generating the control signal inputted to the control terminal REMOTE of the DC step-down converter 32 (in the drawing, indicated by one-dot chain line) has a configuration in which the DC step-down converter 32 and the MCU 5 are insulated.

5) In addition, a communication path of the battery system 1 and the MCU 5 is connected via a digital isolator DI that is a circuit for signal insulation and thus is insulated.

By virtue of the foregoing, the MCU 5 operated by another power supply (for example, a 12 V power supply system) and the battery system 1 operated by the power supply system can be electrically insulated, and thus malfunction due to short-circuiting of another power supply and so forth can be prevented and reliability can be thus improved.

Fifth Embodiment

FIG. 18 is an explanatory diagram illustrating an example of a specific circuit configuration of a battery system according to a fifth embodiment.

SUMMARY OF THE EMBODIMENT

A summary of the present embodiment is applied to a battery system (battery system 1) including a battery (battery 2) formed of a plurality of secondary battery cells (battery cells 2a) directly connected and a battery control unit for controlling charging and discharging of the battery (balancing circuit 4, MCU 5, battery monitor AFE 6).

The battery control unit includes a battery monitor unit (battery monitor AFE 6) for monitoring the secondary battery cells and a cell balancing circuit (balancing circuit 4) for controlling cell balancing of the battery. The cell balancing circuit includes: a pulse generating circuit (pulse voltage generating circuit 31a, pulse signal generating circuit 31b) supplied with a second power supply voltage (power supply voltage VCC) made by stepping down a first power supply voltage (power supply voltage VBAT) supplied from the battery, the pulse generating circuit generating a pulse signal having an optional cycle from the second power supply voltage; and first DC converters connected between an electrode at a highest potential and an electrode at a lowest potential of an optional number of secondary battery cells being directly connected and generating a charging voltage for collectively charging the optional number of secondary battery cells based on the pulse signal generated by the pulse generating circuit.

Moreover, the battery monitor unit specifies which of the optional number of secondary battery cells being directly connected to charge based on a charge control signal (address information) for selecting which of the secondary battery cells to charge, and outputs an operation control signal (ON/OFF signal) to the first DC converters to which the optional number of secondary battery cells are connected, the first DC converters being operated based on the operation control signal, so that the optional number of secondary battery cells are charged.

Hereinafter, the embodiment will be described in detail based on the summary described above.

While the battery cells are individually charged by the balancing circuit 4 in the configuration in FIG. 17 of the fourth embodiment, for example, as illustrated in FIG. 18, a plurality of battery cells may be collectively charged in the configuration.

While variations of the battery cells are mainly caused by manufacturing variations, if they are in several cells, it is not difficult to uniform characteristics. In this case, loss is not so large even when passive cell balancing to the battery cells.

In this case, changed points from FIG. 17 are the following.

1) The passive cell balancing circuit is connected to each battery cell.

2) The DC converter 30 in the balancing circuit 4 has a configuration in which, for example, four battery cells are collectively charged.

Note that, in the configuration of FIG. 18, to charge four battery cells, setting a setting voltage for stopping charging to about 16.8 V (4.2 V×4) and changing of the winding ratio of the transformer 33 are needed at the same time.

In this manner, the number of circuits in the balancing circuit 4 can be reduced and thus a cost lowering of the battery system 1 can be achieved.

In the foregoing, the invention made by the inventor of the present invention has been concretely described based on the embodiments. However, it is needless to say that the present invention is not limited to the foregoing embodiments and various modifications and alterations can be made within the scope of the present invention.

INDUSTRIAL APPLICABILITY

The present invention is suitable for technology of cell-balance control of a battery system used in EVs and HEVs.

DESCRIPTIONS OF REFERENCE SYMBOLS

1 Battery system
2 Battery
2a Battery cell
2b Battery cell set
3 Battery control unit
4 Balancing circuit
5 MCU
6 Battery monitor AFE
7 Motor control unit
8 DC power source
9 ECU
10 CAN transceiver/receiver
11 CAN transceiver/receiver
12 SPI
13 CPU
14 CAN interface
15 Memory
16 Analog multiplexer
17 A/D converter
18 API
19 SPI
20 Register group
21 Level shifter
22 Level shifter
23 Discharge control unit
23a Charge control signal output unit
24 Regulator
25 DC converter
26 Switching element
27 Transformer
27a Transformer
28 DC/AC converter
29 DC/DC converter
30 DC converter
31 Pulse voltage generator unit
31a Pulse voltage generating circuit
31b Pulse signal generating circuit
32 DC step-down converter
33 Transformer
34 PWM control unit
35 PWM control unit
M Motor
BC CAN bus
OP1 Operational amplifier
C1 Capacitor C2
D1-D3 Diode
D6-D12 Diode
L1 Inductor
L2 Saturable inductor
L3 Inductor
REG Register
R1-R6, RR1-RR2 Resistor
R20 Resistor
Rr Resistor
T1-T3, TT1-TT2 Transistor
T6-T10 Transistor
T20-T23 Transistor
CE1-CE4 Battery cell
B1 Buffer
PC1 Photocoupler
PC2 Photocoupler
INV1 Inverter
ZD1 Zener diode
DI Digital isolator

The invention claimed is:

1. A battery system comprising:
a battery comprising a plurality of secondary battery cells connected together in series;
a battery monitor unit for monitoring the secondary battery cells; and
a cell-balancing circuit for controlling cell balancing of the battery,
wherein the cell-balancing circuit includes:
a pulse generating circuit to which a second power supply voltage is supplied, the second power supply voltage being made by stepping down a first power supply voltage supplied by the battery; and
a plurality of voltage converters, each voltage converter being connected to a respective one of the secondary battery cells and being configured to generate a charging voltage for charging the respective secondary battery cell based on the pulse signals generated by the pulse generating circuit, wherein the battery monitor unit specifies which of the secondary battery cells to charge, and outputs respective operation control signals to the voltage converters, wherein the voltage converters are operated based on the operation control signal to charge the secondary battery cells, wherein the pulse generating circuit comprises a plurality of transformers, each transformer corresponding to one of the voltage converters, wherein the pulse generating circuit is constructed to transmit pulse signals generated from the second power supply voltage to the corresponding voltage converter via the transformers, and wherein each voltage converter comprises a magnetic amplifier type converter including a saturable inductor and is configured such that the saturable inductor regulates current flow to the respective secondary battery cell based on a voltage of the respective secondary battery cell.

2. The battery system according to claim 1,
wherein the magnetic amplifier type converter of each voltage converter is configured as a forward converter.

3. The battery system according to claim 1,
wherein the magnetic amplifier type converter of each voltage converter is configured as a flyback converter.

4. The battery system according to claim 1,
wherein the pulse generating circuit further includes:
a switching element for switching based on a switching signal.

5. The battery system according to claim 1,
further comprising a second voltage converter for generating the second power supply voltage to be supplied to the pulse generating circuit by stepping down the first power supply voltage supplied from the battery.

6. The battery system according to claim 1,
wherein the battery monitor unit includes a register unit for storing information that specifies which of the secondary battery cells to charge, and
the battery monitor unit searches for the information stored in the register unit based on a charge control signal and outputs the respective operation control signals based on said search.

7. The battery system according to claim 6, further comprising an electric control unit
connected to the battery monitor unit via a communication bus, and
the charge control signal inputted to the battery monitor unit is a signal outputted from the electric control unit via the communication bus.

8. The battery system according to claim 7,
wherein a communication protocol interface of the communication bus is a controller area network (CAN).

9. The battery system according to claim 1,
wherein each magnetic amplifier type converter includes a circuit with at least the saturable inductor, an operational amplifier and a transistor, the circuit being configured such that current flowing to the saturable inductor via the transistor is modified based on input voltages applied to the operational amplifier, one of the input voltages being based on a voltage of the respective secondary battery cell.

10. The battery system according to claim 1, further comprising a discharge resistor, wherein the battery monitoring unit is configured to connect a subset of the secondary battery cells to the discharge resistor, the subset being secondary battery cells indicated to be discharged.

* * * * *